Figure 3:
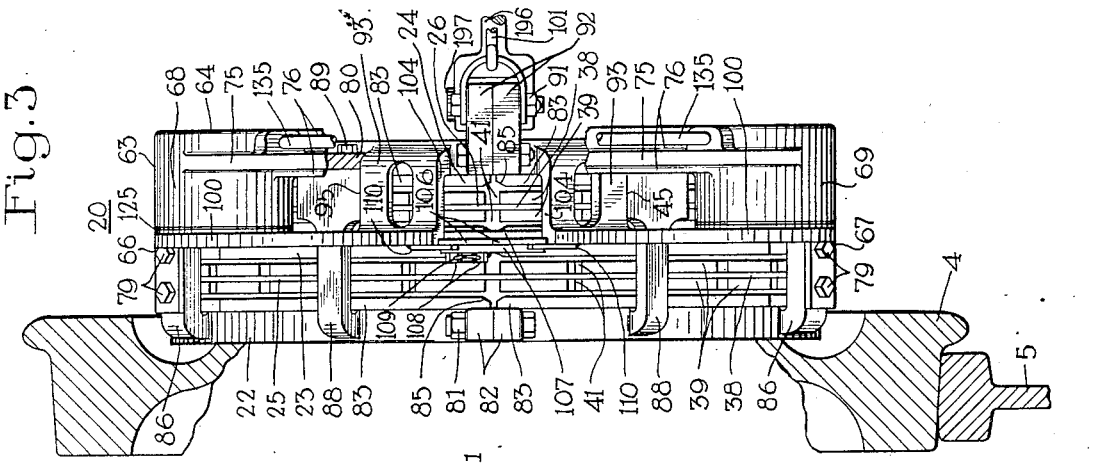

Jan. 19, 1943.  J. C. McCUNE  2,308,890
BRAKE MECHANISM
Filed Aug. 20, 1941  4 Sheets-Sheet 1

INVENTOR
Joseph C. McCune
BY
A. M. Higgins
ATTORNEY

Jan. 19, 1943. J. C. McCUNE 2,308,890
BRAKE MECHANISM
Filed Aug. 20, 1941 4 Sheets-Sheet 2

INVENTOR
Joseph C. McCune
BY
ATTORNEY

Jan. 19, 1943.   J. C. McCUNE   2,308,890
BRAKE MECHANISM
Filed Aug. 20, 1941   4 Sheets-Sheet 3
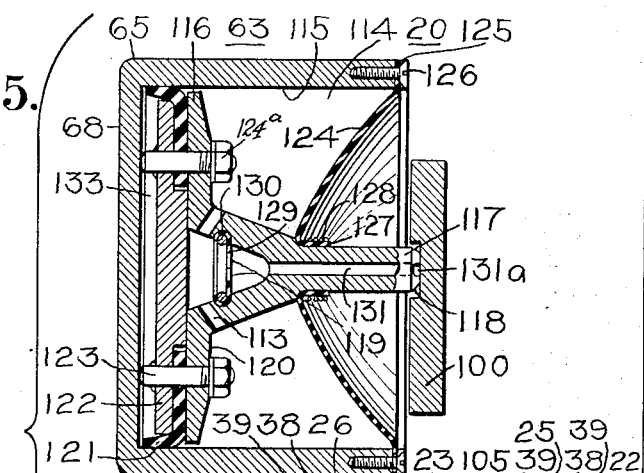
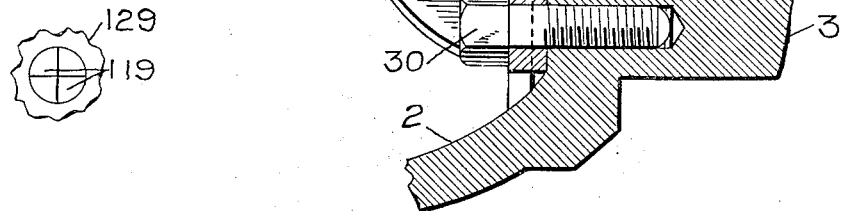
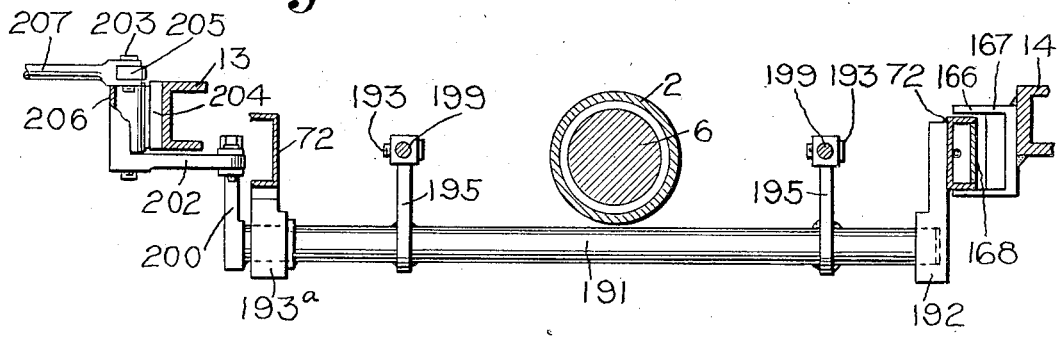
INVENTOR
Joseph C. McCune
BY
ATTORNEY Jan. 19, 1943.    J. C. McCUNE    2,308,890
BRAKE MECHANISM
Filed Aug. 20, 1941    4 Sheets-Sheet 4
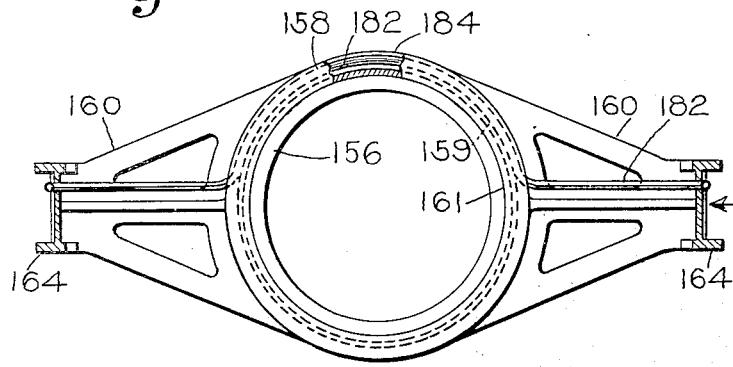
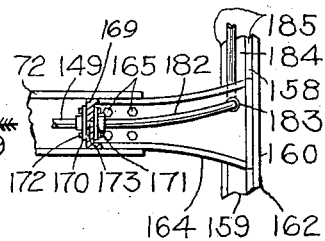
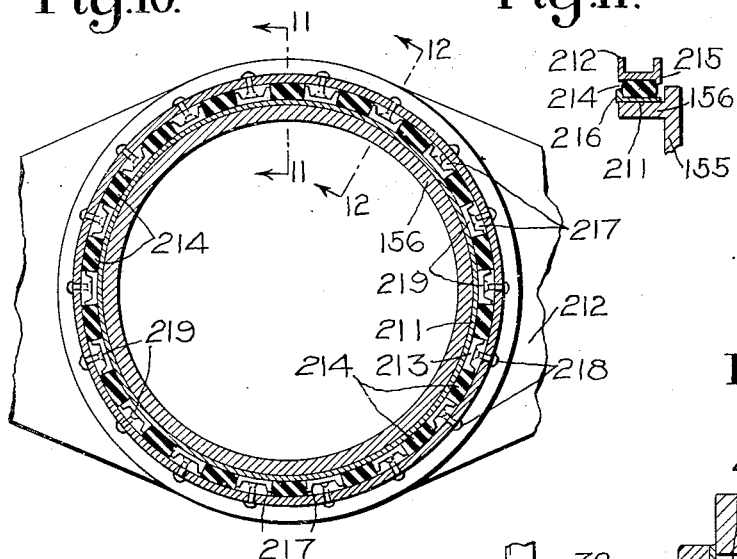
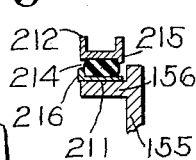
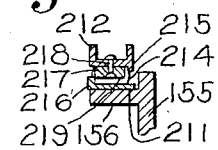
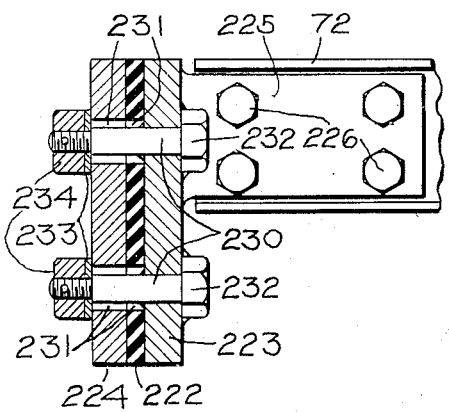
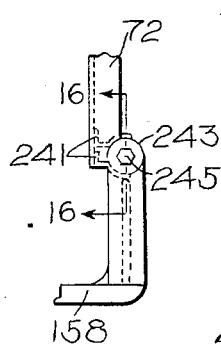
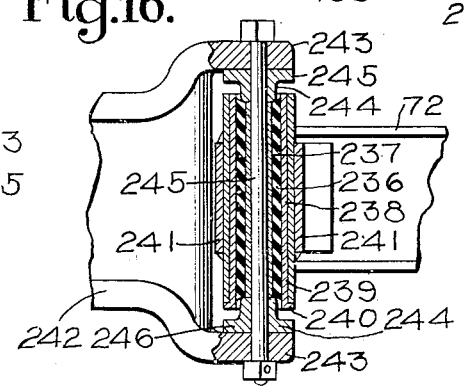
INVENTOR
Joseph C. McCune
BY
ATTORNEY Patented Jan. 19, 1943

2,308,890

UNITED STATES PATENT OFFICE 2,308,890

BRAKE MECHANISM

Joseph C. McCune, Edgewood, Pa., assignor to The Westinghouse Air Brake Company, Wilmerding, Pa., a corporation of Pennsylvania Application August 20, 1941, Serial No. 407,554

58 Claims. (Cl. 188—59)

This invention relates to brake mechanism and more particularly to the type for use on vehicles such as employed on railroads.

One object of the invention is the provision of an improved brake mechanism of this type.

Another object of the invention is the provision of an improved brake mechanism for a wheel and axle supporting structure of a railway vehicle truck arranged to be carried by the journal boxes at opposite sides of said truck.

Another object of the invention is the provision of an improved brake mechanism for a wheel and axle supporting structure of a railway vehicle truck of the type in which the journal boxes are located outboard of the wheels and in which the braking means of the brake mechanism are located between the wheels and are wholly supported on the journal boxes by a structure extending transversely across the truck and around the wheels to the journal boxes.

Another object of the invention is the provision of a brake mechanism such as just defined in which the brake supporting structure has at one side of the wheel and axle supporting structure a torque connection to a part of the vertically movable truck frame for holding the brake mechanism against turning during braking and in which the connections between the brake supporting structure and journal boxes provide for adjustment of the brake supporting structure to vertical movement of the frame relative to the wheel and axle supporting structure.

Another object of the invention is the provision of a power brake mechanism of the above type for railway vehicles having hand operated means for actuating same.

Another object of the invention is the provision of an improved disk brake device which is relatively simple, compact and rugged, and in which relatively large bearing surfaces are provided for all movable parts to insure long life thereof and which embodies power cylinders both the action and reaction of which are taken by the braking elements in order to obviate the need of thrust bearings or the like and to prevent placing any part of the truck under strain by such forces.

Another object of the invention is the provision of a disk brake structure such as above defined which is so constructed that it may be applied to a railway vehicle truck, or may after installation be repaired, with the truck wheels in place on their connecting axle.

Other objects and advantages will be apparent from the following more detailed description of the invention.

Figure 2:
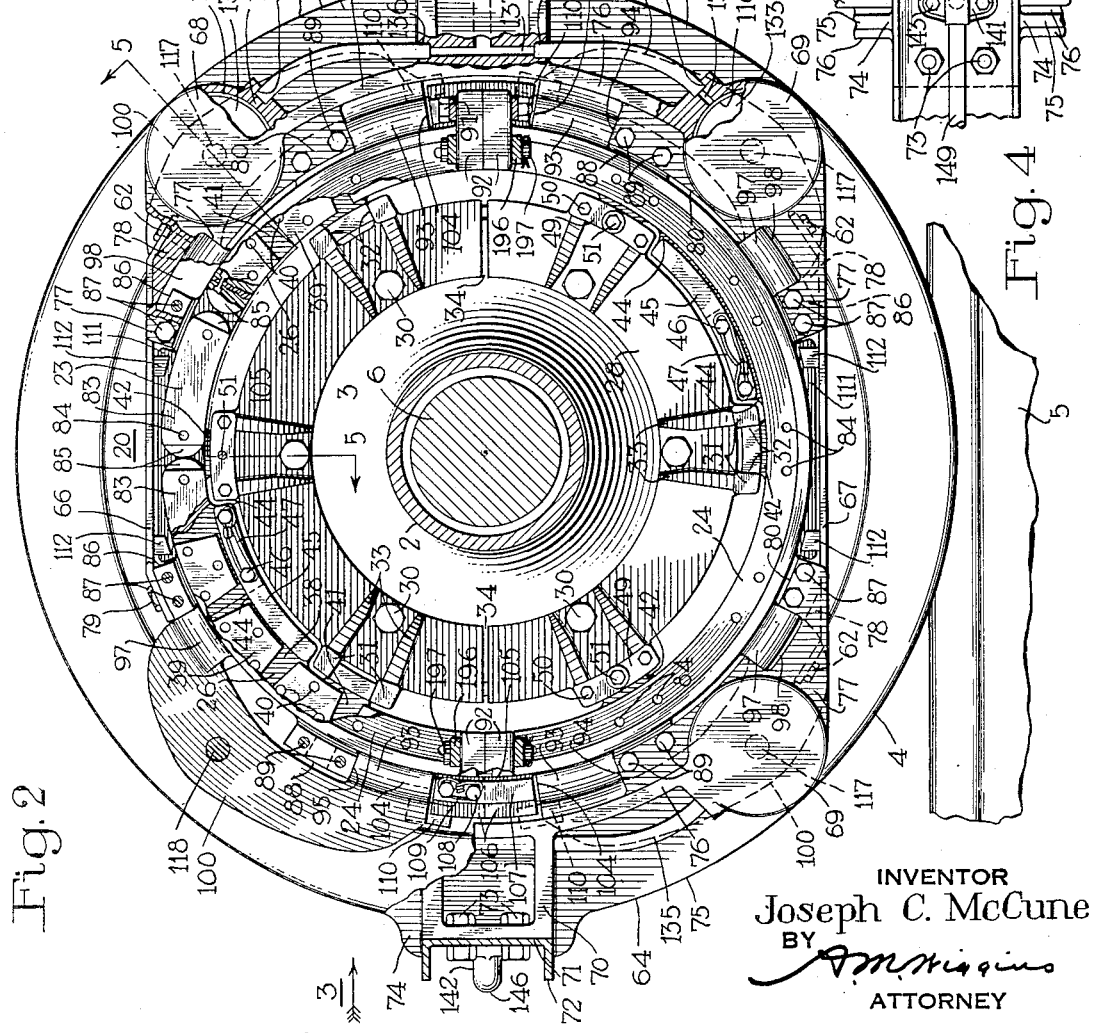
Figure 4:
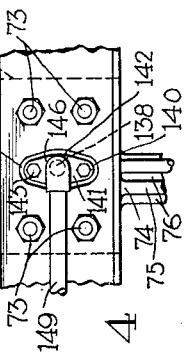

In the accompanying drawings, Fig. 1 is a plan view, partly in section and partly in outline, of a portion of one end of a railway vehicle truck and of the improved brake mechanism associated therewith; Fig. 2 is an end view, with certain parts broken away to show interior construction of one of the two brake devices comprising the brake mechanism shown in Fig. 1, said view being taken in the direction of the arrow 2 in Fig. 1; Fig. 3 is a side view of one of the two brake devices shown in Fig. 1 looking in the direction of arrow 3 in Fig. 2 and with certain central parts broken away to bring out interior structural details; Fig. 4 is an exterior view of the parts broken away in Fig. 3; Fig. 5 is a sectional view taken on the line 5—5 in Fig. 2; Fig. 6 is a partial plan view of an element shown in Fig. 5; Figs. 7 and 8 are sectional views taken on the lines 7—7 and 8—8 in Fig. 1; Fig. 9 is a view looking in the direction of arrow 9 in Fig. 8; Fig. 10 is a view similar to a portion of Fig. 8 but showing at an enlarged scale a modified structure; Figs. 11 and 12 are sectional views taken on the lines 11—11 and 12—12 in Fig. 10; Fig. 13 is a plan view of a portion of one end and side of a modified form of brake carrying structure; Fig. 14 is a sectional view taken on the line 14—14 in Fig. 13; Fig. 15 is a view similar to Fig. 13 but showing another modification of the invention; and Fig. 16 is a sectional view taken on the line 16—16 in Fig. 15.

*Description of truck*

As shown in Fig. 1 the improved brake mechanism is associated with a railway vehicle truck which for the purpose of illustration may be of the type comprising a truck frame 1 supported on wheel and axle supporting structures; only one end of the frame and one of the wheel and axle supporting structures being shown, however, since a further showing is not deemed essential to a clear understanding of the invention.

The wheel and axle supporting structure shown in the drawings comprises a rotatable axle tube 2 having at each of its opposite ends an enlarged sleeve-like portion 3 on each of which is rigidly secured, preferably by pressing, a truck wheel 4. The tube 2 spaces the two wheels 4 for rolling on rails 5 of a railway track, and the connections between the wheels and tube provides for both turning together.

A normally stationary axle 6 extends through the tube 2 and is supported in each of the sleeve-like portions 3 thereof by an anti-friction bearing 7. A journal box 8 is mounted on the axle 6 outboard of each of the wheels 4. Each of the journal boxes comprises a central sleeve-like bearing 9 resting on the axle 6 and a housing 10 carrying said bearing through the medium of suitable resilient elements 11 made from rubber or the like.

The truck frame 1 comprises two side frame members 12 one of which is disposed over each of the journal boxes 8, and a transversely extending end piece 13 and transom 14 which rigidly connect said side members together. The side frame members 12 may be connected to the journal boxes 8 by depending pedestal legs 15 and be supported on said boxes by springs 16 which provide for movement of the frame in a vertical direction relative to the wheel and axle supporting structure or assembly.

Description of brake—Figs. 1 to 9

The brake mechanism for the wheel and axle supporting structure comprises two brake devices 20 and 21 which are identical in structure, oppositely disposed and spaced apart so that one of the brake devices is adjacent each of the wheels 4, as shown in Fig. 1.

Each of the brake devices 20 and 21 comprises three friction brake stators or elements 22, 23 and 24 arranged in the order named and two friction brake rotors or elements 25 and 26, the rotor element 25 being interleaved between stator elements 22 and 23 while the rotor element 26 is interleaved between the stator elements 23 and 24. The two rotor elements 25 and 26 are of ring-like disk form and the several stator elements 22 to 24 are preferably though not necessarily, of the same form, all of these elements having the same inside and outside diameters and encircling the axle tube 2 in coaxial relation therewith and thus with the wheels 4.

Disposed within each pile of brake elements 22 to 26 is a torque ring 28 having on the wheel side six outwardly extending pads 29 which are equally spaced apart about the ring, one of these pads may be seen in Fig. 1 and another in Fig. 5. These pads on each ring 28 engage the inboard end of the adjacent sleeve-like portion 3 of the axle tube 2, as shown in Figs. 1 and 5, and a cap screw 30 extending through each pad into said sleeve-like portion rigidly secures the torque ring 28 to the tube 2 for rotation with the wheel and axle assembly. The several pads 29 space the rings 28 from the sleeve-like portions 3 of the axle tube 2 in order to provide for free circulation of air between said rings and tube.

At each side of each pad 29 the torque rings 28 are provided with a torque lug 31 extending outwardly from the periphery of the ring and parallel to the axis thereof and overhanging both sides of the ring. The adjacent faces 32 of the two lugs 31 at either side of each pad 29 are finished preferably in line with the radius of the ring and provide relatively wide, flat bearing surfaces over the length of the lugs for reasons which will be later brought out.

The portion of each lug 31 which extends beyond the side of the torque ring 28 opposite the wheel 4 is connected to the adjacent side of said ring by an arcuate shaped radially extending web 33 which rigidly supports this extended portion of the lug and which also is adapted to act in the capacity of a fan blade upon rotation of the torque ring with the wheel 4 to create a forced circulation of air in the direction away from the axle tube 2 for dissipating heat from the brake during braking operation.

Each torque ring 28 is made in the form of a solid ring and after such machine work as required thereon is completed, the ring is separated into two substantially semi-circular sections by cuts 34 in order that the ring may be mounted around the axle tube 2 and secured to the end of the sleeve-like portion thereof.

As will be seen in Figs. 1 and 5, the inside diameter of the several friction brake elements or rotors and stators is greater than the diametrical distance across the lugs 31 and in each brake the two rotors encircle said lugs on the respective ring 28.

Each of the rotors 24 and 25 comprises a central portion 38, preferably made from sheet metal in the form of a ring, and secured to each of the opposite faces of this central portion are a plurality of friction elements or brake shoes 39 preferably made of cast iron. These shoes are spaced apart and secured to the central portion 38 by rivets 40. The spacing of the shoes provides between each adjacent pair a radially extending duct 41. By this construction the ends of the shoes 39 upon rotation of the rotors will act like fan blades to create a forced flow of air through the ducts 41 for the purpose of dissipating heat from the brake and to also blow from the brake any foreign matter which may enter said ducts, such for instance as particles of cast iron which may be worn or scraped off the braking faces of the several shoes 39.

The central portion 38 of each of the rotors is provided with a plurality of inwardly extending portions or lugs 42 which are so located as to be disposed in the spaces between the pairs of lugs 31 on the torque ring 28. A pad 43 is secured, preferably by welding, to each of the opposite faces of each of the inwardly extending portions 42 and the opposite ends of each of these inwardly extending portions and the associated pads are finished in line with the radius of the ring for sliding contact with faces 32 on the adjacent faces of each pair of lugs 31. The pads 43 provide a relatively wide bearing surface with faces 32 in the direction across the pads and since the engaging faces 32 on the lugs 31 and those on the pads and on the inwardly extending portions 42 of the rotors are both formed at the same angle a relatively wide radial bearing surface or contact is also obtained.

Each of the rotors 25 and 26 is preferably made in two substantially semi-circular sections for application around the axle tube 2. These sections are preferably joined at points located substantially midway between two diametrically opposite pairs of inwardly extending portions 42. At both ends of each section the central portion 38 has an inwardly extending ear 44 and overlapping each adjacent pair of ears at both sides of the rotor is an arcuate shaped metal strip 45. These strips are secured, preferably by welding, to one ear 44 on one of the sections and to the diametrically opposite ear on the other section and are rigidly secured to the other ears of the two sections by screws 46. These screws are in turn secured in place at both sides of the rotors by lock wires 47 extending through suitably drilled holes in the heads of the screws. By this structure both of the rotors may be assembled around the axle tube 2 and then rigidly secured together to provide a solid ring and this ring may then be mounted on the torque ring 28 with the inwardly extending portions 42 mounted to slide between the lugs 31 at either side of the torque screws 30.

A stop plate 49 is secured by screws 50 to the inboard ends of each of a plurality of the pairs of lugs 33 on the torque rings 28. These plates are equally spaced apart and any desired number may be provided up to the number of the pairs of lugs 31. Slidably mounted in a bore in each of the plates 49 is a rotor release bolt 51 having a portion 52 of enlarged diameter extending through the space between the lugs 31 back of the plate and through bores in the portions 42 and pads 43 extending therein from the rotors 25 and 26. Each bolt has a head 53 at the end adjacent the wheel for engaging the adjacent pad 43 on the extension 42 of rotor 25, while at the opposite end of the enlarged portion of each bolt is a shoulder 54 for engaging the inner surface of the stop plate 49 as shown in Fig. 5. A spacer spring 55 is mounted on each of the bolts 51 between the inwardly extending portions 42 of the rotors 25 and 26 and bears against the pads 43 secured to the adjacent faces of said portions. Secured to each of these pads by welding is a support washer 56 which extends into the coils at the opposite ends of the spring 55 for supporting said spring in concentric relation with the release bolt 51 and in operative relation with the pads 53. These springs are at all times under compression for urging the two rotors 25 and 26 apart.

Each of the release bolts 51 has a portion 57 of reduced diameter extending beyond the inboard face of the respective stop plate 49, and slidably mounted on this portion are a pair of oppositely disposed spring seats 58. One of these spring seats engages the stop plate 49 while the other engages a nut 59 secured to the inner end of the release bolt. Encircling each bolt 51 and interposed between and engaging the two spring seats 58 thereon is a rotor release spring 60.

The several release springs 60 are under compression and therefore effective to urge the shoulders 54 on the bolts 51 into contact with the inner face of the respective stop plates 49 for thereby pulling the rotor 25 to its brake release position shown in Figs. 1, 3 and 5. With the rotor 25 thus positioned the springs 55 are adapted to urge the rotor 26 to its brake release position also shown in Figs. 1, 3 and 5 in which the pads 43 opposite those engaged by springs 55 contact the stop plates 49 which act to define such position. Thus the shoulders 54 on the several release bolts 51 are effective to define the release position of the rotor 25 and the stop plates 49 act in the same capacity in connection with the rotor 26. It will, however, be noted that both rotors are capable of movement in the direction of the adjacent wheel against the force of springs 55 and 60.

In each of the brakes 20 and 21 a subtsantially annular brake cylinder device 63 encircles the stator 24, the rotor 26 and overlies a portion of the stator 23. Each brake cylinder device comprises two arcuate shaped sections 64 and 65 which are oppositely disposed one at each of the opposite sides of the axle tube 2, the two sections being joined above the axle tube by a removable plate 66 and below the axle tube by a removable plate 67, said plates overlying the adjacent ends of the sections and being secured thereto by screws 62.

Both of the brake cylinder sections 64 and 65 are substantially alike in structure, each comprising two relatively small cylindrical brake cylinders 68 and 69 one of which is disposed above a horizontal plane including the axis of the wheel and axle assembly and the other is disposed in a similar position below. Intermediate the two brake cylinders 68 and 69 each of the arcuate shaped brake cylinder sections is provided with a mounting bracket 70 having on its outer end a vertically arranged flat face 71 in contact with the end face of a supporting channel 72 which extends parallel to the ground transversely of the truck and which is carried by means to be hereinafter described. Each bracket 70 is rigidly secured to the associated channel 72 by bolts 73 and both above and below the channel 72 the bracket is provided with ears 74 which overlap the sides of the channel for contact therewith. The ears 74 are of no consequence when the bolts 73 are in place but before assembling the bolts are adapted to act as a support for the brake cylinder device during the process of assembling same on a truck.

The brake cylinders 68 and 69 in each section 64 and 65 of the brake cylinder devices 63 are connected to the bracket 70 by radially extending arcuate shaped ribs 75, the outer edges of which are formed at substantially the same radius as that of the truck wheel 4, the ears 74 constituting extensions of one end of these ribs. The inner edge of each rib 75 joins an arcuate rib 76 extending at right angles to the sides of rib 75 and joined at one end to the inner edge of bracket 70 and at the opposite end to the respective brake cylinder inwardly of the axis thereof. Extending from the side of each brake cylinder 68 and 69 opposite that connected to the bracket 70 is a radially extending rib 77 and a rib 78 arranged at right angles to the rib 77, the ribs 77 and 78 being aligned with the ribs 75 and 76, respectively. In each brake cylinder section the opposite ends of the ribs 77 and 78 are formed parallel to each other with the ends of ribs 77 terminating short of the ends of ribs 78 a distance equal to the thickness of plates 66 and 67 which engage same.

The plates 66 and 67 extend over the ends of ribs 78 and are then bent inwardly to contact the outer surface of said ribs beyond their ends. The cap screws 62 extend through these bent end portions of plates 66 and 67 into ribs 78 for rigidly securing the plates to said ribs so as to rigidly secure the two sections of the brake cylinder devices together.

From Fig. 2 it will be seen that the horizontal distance across the brake cylinder devices 63 exceeds the diameter of the truck wheel 4 over the flange thereon but the vertical distance, as defined by the parallel flat portions of the connecting plates 66 and 67, is substantially less than the diameter of the wheel so that there can be no interference between the brake cylinder devices and any part of the track, such as rails 5.

Each section 64 and 65 of the brake cylinder device 63 is provided at both ends with a rib 80 projecting inwardly from the rib 76 opposite the rib 75, each rib 80 extending from the end of the section toward the bracket 70 but terminating short of same. The purpose of ribs 80 will be hereinafter brought out.

The stator 22 is ring shaped as above mentioned and is preferably made in two semi-circular sections to provide for mounting around the axle tube 2. These sections are assembled in end to end relation and rigidly secured together by bolts 81 extending through lugs 82 projecting from the adjacent ends of the sections. On the inner face of the stator 22, that is the face adjacent the rotor 25, there are provided a plurality of friction elements or shoes 83 for frictionally contacting the shoes 39 provided on the adjacent face of rotor 25. The shoes 83 are relatively short and arcuate in form and are secured in place by rivets 84. The adjacent ends of the shoes 83 are spaced apart and preferably rounded and the end of these rounded parts is provided with a bevel 85 to avoid the possibility of interlocking of the leading ends thereof with the ends of the brake shoes 39 on the rotor, during braking.

Both above and below the axle tube 2 the stator 22 in each brake is provided with two spaced arms 86 which project radially outwardly from the periphery of the stator to a slight degree and which then extend over the peripheries of several of the brake elements parallel to the axis thereof and which terminate against the ends of ribs 80 which are adjacent the ends of the two sections 63 and 64 of the brake cylinder device 63. Bolts 87 extend through the ends of ribs 80 into the arms 86 rigidly securing said arms and thereby the stator 22 to the brake cylinder device 63. The removable plates 66 and 67 joining the opposite ends of the two sections of each brake cylinder device 63 overlaps the arms 86 projecting from the stator 22 and are secured thereto by cap screws 79 to thereby increase the rigidity and strength of the structure embodying the brake cylinder device and the stator 22.

At each of the opposite sides of the axle tube the stator 22 also has two arms 88 which are spaced apart between the arms 86 and like the latter extend over the rotor 25, stator 23, and rotor 26 into contact with the opposite ends of ribs 80 of the brake cylinder device to which said arms are connected by cap screws 89. In each brake the eight arms 86 and 88 thus provide a rigid connection between the stator 22 and brake cylinder device 63 at eight points spaced around the periphery of the stator.

In each brake the outer stator 24 is similar to the inner stator 22 in that it is formed in two substantially semi-circular sections which are arranged in end to end abutting relation and rigidly secured together by bolts 91 extending through lugs 92 projecting from the outer face thereof at the opposite abutting ends of the sections. On the inner face of the stator 24 are a plurality of spaced braking elements or shoes 83 secured in place by rivets 84, like the corresponding shoes on the stator 22, but in this case the shoes 83 are arranged for frictional engagement with the brake shoes 39 provided on the adjacent face of rotor 26.

Between the brake cylinders 68 and 69 in each brake cylinder section 64 and 65, the stator 24 has two arms 93 one of which is disposed above the lugs 92 while the other is below said lugs. These arms extend outwardly from the edge of the stator 24 and then parallel to its axis and to the arms 88 in the direction of the stator 22. The opposite sides of the two arms in each brake cylinder section have sliding contact with the adjacent end surfaces 94 of ribs 80 and with the aligned side portion 95 of the arms 88.

Between each of the brake cylinders 68 and 69 and the adjacent arm 86 projecting from stator 22 the stator 24 has an arm 97 similar to the arms 93 but extending through an opening 98 in the aligned brake cylinder rib 80, and having sliding contact at its opposite sides with the opposite side walls of said opening and with the adjacent side of said arms 86. It will be apparent that the connections between the several arms 93 and 97 and the brakes cylinder sections and arms 86 and 88 on the stator 22 secures the stator 24 against turning relative to the brake cylinder device but provides for relative axial movement. Furthermore, the sides of the stator arms 93 and 97 and the surfaces which they engage are preferably formed radially and are flat to obtain a large degree of bearing contact to provide long life.

The inner ends of each pair of arms 93 and 97 provided at the opposite sides of each brake cylinder 68 or 69 are joined to a radially extending pressure plate 100 which partially overlies the inner and open end of the brake cylinder. In each brake the several pressure plates 100 are provided for movement by the brake cylinders 68 and 69 in the direction of the adjacent wheel 4, as will be hereinafter described, to effect operation of the brake device to brake the wheels 4.

The intermediate stator 23 in each brake comprises a central ring-like section 105 preferably made from sheet steel and carrying on both of its opposite faces brake shoes 23 secured in place by rivets 84 and arranged for frictional interengagement with the brake shoes 39 provided on the adjacent faces of rotors 25 and 26. The central section 105 of each stator 23 is also made in two semi-circular sections for application around the axle tube 2. At the adjacent and engaging ends of these sections each section is provided with an outwardly extending ear 106 and securing plates 107 overlap the adjacent ears. These plates are preferably secured to one ear 106 on one of the sections by welding and to the adjacent ear by cap screws 108 which are held in place by a wire 109 extending through suitable bores provided in the heads of said screws.

The two engaging ears 106 and securing plates 107 at opposite sides of the axle tube 2 are disposed between the adjacent sides 104 of the two arms 93 projecting from each of the opposite sides of stator 24 and have sliding contact with said sides for holding the stator 23 against turning relative to the stator 24, but providing for relative axial movement between said stators.

The ears 106 at the opposite sides of each stator 23 extend beyond the securing plates 107 for engagement on the side adjacent the wheel 4 by release fingers 110 which are secured to and project from the outboard faces of the adjacent pressure plates 100.

A lug 111 projects from the central section 105 of each stator 23 at both the top and bottom thereof into the space between the arms 86 projecting from the stator 22, and the opposite ends of these lugs slidably contact the adjacent sides of said arms. These lugs 111 engaging arms 86 of stator 22, cooperate with ears 106 and securing plates 107 engaging arms 93 of stator 24 to securely hold the stator 23 against turning relative to the stators 22 and 24 but provide for relative axial movement of stator 23, as will be apparent.

The slidable contacting surfaces of stator 23 and arms 93 on stator 24 and arms 86 on stator 22 are flat and preferably radial to provide for long life.

A release position defining stop 112 for each stator 23 is secured by welding to the inner face of both plates 66 and 67 adjacent the ends of both sections of the brake cylinder devices.

These stops project into the path of movement of the lugs 111 and are adapted to be engaged thereby for limiting movement of the stator 23 in a direction away from the adjacent wheel 4 and for thereby defining the release position of said stator.

In each of the brake devices 20 and 21, one end of a release spring 101 is connected to the bolts 91 in lugs 92 of stator 24 at each side of the axle tube 2. The opposite ends of these springs are anchored to brackets 102 which are rigidly secured to the brake support channels 72. These springs are under tension and therefore act on the connected stator 24 and through the medium of fingers 110 on the stator 23 to pull both of said stators in a direction away from the adjacent wheel 4. This movement of both stators 23 and 24 under the action of springs 101 is however limited by the lugs 111 on stator 23 engaging the stops 112 which act to define the brake release position of the stator 23, and indirectly through fingers 110 the brake release position of stator 24. The springs 101 will resiliently hold the stators 23 and 24 in their release positions when the brakes are released, as will be apparent.

Since the stops 112 act on oppositely disposed parts of stator 23 which parts are spaced from the parts engaged by fingers 110, it will be apparent that when the brakes are released the stator 23 will be securely held in parallel relation with the rotors 25 and 26. Also the four fingers 110 engaging four spaced parts of stator 24 will ensure its being supported in parallel relation to the rotors by springs 101, when the brakes are released.

Each brake cylinder 68 and 69 has a piston bore 115 which is open at the end adjacent the pressure plate 100 and which is closed at the opposite end. A piston 116 is mounted to slide in bore 115 and has an axial stem 117 which engages the pressure plate 100 within a recess 118.

Each piston 116 comprises a head portion 120 with which the stem 117 is preferably integrally formed. Mounted against the inner face of the head portion 120 is a flexible packing cup 121. A follower 122 engages the opposite or pressure face of the packing cup 121 and is provided with a plurality of spaced studs 123 extending through said cup and the head portion 120 of the piston and on the back of said head portion nuts 124a are provided on the studs for securely clamping the packing cup between the follower 122 and head 120. These studs 123 extend beyond the outer face of follower 122 for engaging the closed end of the cylinder to define the release position of the piston in which the edge of the packing cup is out of contact with the closed end of the piston bore 115.

A conical shaped flexible diaphragm 124 closes the open end of each cylinder bore 115 to prevent entrance of foreign matter. The larger end of this diaphragm is clamped to the end of the cylinder by a ring 125 which is held in place by screws 126. With the brake cylinder piston 116 in its release position shown in Fig. 5, the diaphragm 124 extends into the bore 115 and at its center is provided with a cylindrical sleeve 127 through which the piston stem 117 extends and which is secured to said stem preferably by wire 128 wound around the sleeve.

In the end of each piston stem 117 adjacent the follower 122 is a cavity containing a disk valve 129 which is clamped around its edge to the side wall of the cavity by a snap ring 130. One side of this valve is open to a bore 131 extending through the piston stem 117 and opening to cross slots 131a provided in the end thereof which is disposed and supported in recess 118 of the adjacent pressure plate 100. The opposite side of valve 129 is open through bores 113 to a non-pressure chamber 114 at one side of the piston. The disk valve 129 is provided centrally with four flexible segments 119 formed by two cuts made at right angles to each other through the diaphragm. These segments are normally in line as shown in Fig. 5 to close the opening through the diaphragm for preventing foreign matter entering the non-pressure chamber 114 through the piston stem bore 131. In case there is leakage of fluid under pressure to the non-pressure chamber 114 from a pressure chamber 133 provided at the opposite side of the piston 116, the valve segments 119 are adapted to open under such pressure to permit escape thereof through the stem bore 131.

Each brake cylinder 68 and 69 is provided with a bore 132 which opens through the side wall thereof adjacent the closed end to pressure chamber 133 provided between said end and the pressure face of the piston 116. This bore in each brake cylinder extends in the direction of the end of the bracket 70 and is open at its outer end to a counter-bore 134 in which there is secured one end of a pressure pipe 135. The opposite ends of the two pipes 135 from the brake cylinders 68 and 69 in each brake cylinder section are secured in counter-bores 136 provided in the adjacent sides of the bracket 70.

The counter-bores 136 in the opposite sides of each bracket 70 are connected together by a drilled bore 137 which intermediate its ends is open to a bore 138 extending radially through the bracket to the face 71 which engages the end face of the channel 72, the bore 138 opening at said face 71 substantially midway between the opposite sides of the channel and midway between the bolts 73 at the opposite ends of the bracket 70, as shown in Fig. 4.

Openings 140 are provided through the back wall of the channels 72 in line with the ends of bores 138 in the brake cylinder bracket faces 71 to permit the flanged end 141 of a pipe coupling 142 to be secured against the face 71 of each bracket 70 by cap screws 143 extending through said flanged end into the bracket 70 above and below the bore 138.

Each of the pipe couplings 142 is provided with a passage 144 which opens at one end to the bore 138 in the respective brake cylinder bracket 70. Each pipe coupling 142 has a head 146 at the end opposite flange 141 and in this head there is a passage 147 to which the other end of the radial passage 144 is open.

The passage 147 in head 146 of each pipe coupling 142 on both sides of the axle tube 2 is open through the end next to the adjacent wheel 4 to one end of a fluid conducting pipe 149. In the two pipe couplings in channel 72 adjacent the truck transom 14 the opposite and adjacent ends of the passages 147 are connected to the two ends of a pipe 151. The pipe 151 includes intermediate its ends a pipe coupling 152 which connects the pipe 151 to a pipe 153 through which fluid under pressure is adapted to be supplied to and released from the several brake cylinders 68 and 69 by any suitable means for controlling the operation of the two brakes 20 and 21, as will be described hereinafter.

The sleeve bearing 9 in each journal box 8 has at its inboard end an outwardly extending radial flange 155, Fig. 1, and projecting from the inboard face of this flange at a point set in from the edge thereof is a cylindrical journal bearing 156. Between each journal box and the adjacent wheel 4 there is disposed a brake support end member 158 comprising a central annular portion 159 and two oppositely disposed support arms 160 radiating from the central portion. In the central portion 159 of each end piece 158 is secured a ring 161, made of suitable bearing material, which fits over and is journaled on the bearing member 156 provided on the adjacent bearing sleeve 9. At the outboard end of each ring 161 is a radial flange 162 bearing against the portion of the journal box flange 155 which projects beyond the bearing 156, this flange 162 engaging on its opposite face the adjacent face of the brake support member 158.

Each of the support arms 160 extends radially slightly past the periphery of the wheel 4 and to its end is secured, by welding, one end of a channel shaped connecting member 164 which extends around the wheel parallel to the axis thereof. The inboard ends of the two connecting members 164 at one side of the truck axle 2 are disposed within the adjacent ends of the channel 72 and rigidly secured thereto by bolts 165. At the opposite side of the truck axle the connecting members 164 are connected by bolts 165 to the opposite ends of the channel 72.

There is thus provided a rigid substantially rectangular and horizontally disposed frame extending around the two wheels 4 and supported or journaled at its opposite ends on the bearings 156 of the two journal boxes, and this frame supports the two brake cylinder devices 63, the brake stators 22, 23 and 24 and associated parts in cooperative relation with the brake rotors 25 and 26 carried by the opposite ends of the axle tube 2 adjacent the inside faces of the two wheels 4.

The channel 72 adjacent the truck transom 14 extends between the jaws 166 of a torque bracket 167 which is rigidly secured to the adjacent face of the truck transom 14 at the transverse center of the truck frame. This jaw is provided for securing the brake frame including channels 72 and end pieces 158 and the parts of the two brake devices carried thereby against turning when the brakes are applied. A certain degree of looseness is provided between the opposite sides of the channel 72 and the jaws 166 of the torque bracket 167 in order to provide for free vertical movement of the truck frame relative to the truck wheels 4 on the frame supporting spring 16. Due to the journal connections between the brake supporting frame and the inboard ends of the two oppositely disposed journal boxes 8 it will be apparent that the brake frame is capable of rocking relative to the journal boxes to accommodate itself to different vertical positions which the truck frame may assume with respect to the truck wheels.

A plate 168 disposed between the side walls and welded to the back of the channel 72, which is connected to the torque bracket 167, extends substantially between the two connected brake cylinder brackets 70 to provide the desired rigidity of said channel to prevent distortion of the frame under torque forces.

The inboard end of each of the channel shaped connecting members 164 is closed by a wall 169. A pipe coupling 170 is mounted against the inboard face of each of these walls, while a pipe coupling 171 is mounted against the opposite face, the two couplings being held in place by through bolts 172. Through each wall 69 is a bore 173 providing a fluid flow connection between the couplings secured to the opposite faces thereof.

Each of the brake cylinder pipes 149 is connected to the adjacent pipe coupling 170. The two pipe couplings 171 at each side of the truck are connected to the opposite ends of a U-shaped pipe 182 which extends around the wheel at that side of the truck. This pipe 182 extends from each of the couplings 171 between the side walls of the connecting members 164 to adjacent the outer ends of said members and thence through a bore 183 provided in the inner wall of each of said members to a channel shaped space 184 extending over the central annular portion 159 of the brake support member 158 between two spaced ribs 185 of said portion.

It will be noted that the fluid pressure supply and release pipe 153 is connected by pipe 151 to the brake cylinders 68 and 69 in the two arcuate shaped brake cylinder sections 64 and 65 of the brake cylinder devices 63 at the one side of the axle tube 2 and from the pipe 151 through the pipes 149 and 182 to the brake cylinders 68 and 69 in the arcuate shaped portions 64 and 65 of the brake cylinder devices at the opposite side of the axle tube.

Operation

Let it be assumed that the several brake cylinders 68 and 69 of the two brake devices 20 and 21 are at atmospheric pressure and that all parts of said brake devices are in their brake release positions shown in the drawings and above described, under which condition the brake stators 22, 23 and 24 are out of contact with the brake rotors 25 and 26, so that said rotors are free to turn with the wheels 4 and axle tube 2 of the truck.

If it is desired to brake the truck wheels 4, fluid under pressure is supplied to pipe 153 by any suitable means and thence flows through pipe 151 to the several brake cylinders 68 and 69 at the one side of the axle tube and from pipe 151 through the pipes 182 to the brake cylinders 69 and 68 at the opposite side of the axle tube 2.

The fluid under pressure thus supplied to the several brake cylinders 68 and 69 in each brake enters the pressure chambers 133 thereof through bores 132 and acts on the pistons 116 for effecting substantial simultaneous movement thereof and thereby of the pressure plates 100 and connected stator 24 in the direction of the adjacent truck wheel 4. After a certain movement of the stator 24 in each brake in the direction of its respective wheel, the rotor 26 is engaged so that continued movement of the brake cylinder pistons 116 and stator 24 shifts the rotor 26 along the lugs 31 on the torque ring 28 into contact with the intermediate stator 23 which in turn is picked up and shifted axially into contact with the adjacent face of the rotor 25. When this condition is obtained, the continued movement of the several brake cylinder pistons in each of the brake devices then moves the rotor 25 axially into contact with the stator element 22. After all of the stators and rotors in each of the brake devices are thus moved into interengagement, they are pressed together by a force depending upon the degree of fluid pressure effective in the several brake cylinders on the pistons 116 therein, and this pressure may be varied by providing in any conventional manner any desired degree in the control pipe 153.

With the rotors 25 and 26 thus squeezed between the stators 22, 23 and 24, and since the stators are held against turning by the brake supporting frame, including the channel 72, which is connected to the truck transom 14, it will be apparent that a drag is created on the rotors 25 and 26 which acts to decelerate or brake same and thereby the axle tube 2 and connected truck wheels 4. The degree with which the wheels are thus braked depends upon the pressure of fluid supplied to act on the brake cylinder pistons, as will be apparent.

In order to release the brakes on the truck subsequent to an application fluid under pressure is vented from the pipe 153 and thereby from the several brake cylinders 68 and 69 in the two brake devices. When the pressure of fluid is thus relieved on the brake cylinder pistons 116 in each brake, the release springs 101 acting on the stator 24 return same and the stator 23 to their release positions, the release springs 60 return the rotor 26 to its release position, and the springs 55 hold the rotor 25 in its release position, as above described.

Hand brake

Below the axle tube 2 and extending at right angles to said tube are two hand brake operating rods 190 and 191. These rods are arranged parallel to each other and at one end are supported in a bracket 192 secured by welding to the under side of the channel 72 which is adjacent the truck transom 14. The opposite ends of these rods are supported in a bracket 193a secured by welding to the under side of the channel 72 at the opposite side of the axle tube.

Between the two channels each of the rods 190 and 191 is provided with two upstanding lever arms 195 which are secured by welding to turn with the rod. The ends of these arms on the rod 190 are connected by pins 194 to two parallel rods 196 one of which is connected through the medium of a pin 197 to the lugs 92 on the stator 24 of the brake device 20 at one side of the axle tube 2 while the other rod is connected in the same manner by a pin 197 to the lugs 92 of said stator at the opposite side of the axle tube. The lever arms 195 on the rod 191 are connected by pins 193 to two parallel rods 199 which are connected by pins 197 to the lugs 92 of the stator 24 in the brake device 21 at the opposite end of the axle tube.

The two rods 190 and 191 extend through the bracket 193a to beyond the outer face of the channel 72 and to this extended portion of each is secured an upwardly extending lever 200. The upper end of each of the levers 200 is connected to one end of a chain 201, the two chains extending in opposite directions from the levers 200 in the direction of the opposite sides of the truck frame.

The outer end of each chain 201 is connected to one end of a lever 202 which is disposed below the truck frame end piece 13 and mounted to turn on a pin 203 carried by a bracket 204 which is secured to the outer end face of said end piece. Above this bracket is a lever 205 extending in a direction transversely of the truck and through which the pin 203 extends. The two levers 202 and 205 are integrally connected for movement in unison about the pin 203 by a substantially semi-circular bridge member 206 through the center of which the pin 203 extends.

The two levers 205 are adapted to be operated in unison and may therefore be connected by rods 207 to the opposite ends of an equalizer lever 208. The equalizer lever 208 may be connected intermediate its ends to one end of a rod 209 the opposite end of which may be connected in any suitable manner to a hand operated brake mast or the like on the truck through the medium of which the brakes on the truck may be applied manually.

In order to actuate the two brake devices 20 and 21 manually to brake the truck wheels 4 a trainman or the like may apply force to the equalizer lever 208 for moving same in a direction away from the end piece 13 of the truck frame. This operation will cause rocking of the connected levers 205 and 202 in such a direction as to pull the chains 201 away from each other in the direction of the opposite sides of the truck frame. This movement of the chain 201 connected to the brake rod 190 will turn same in such a direction as to cause the connecting rods 196 to move the connected stator 24 in the brake device 20 in the direction of the adjacent car wheel 4 for thereby urging the several rotors and stators in said brake device into frictional contact in the same manner as when operated by the brake cylinder pistons 116 in said device to apply the brakes. In a like manner rotation of the brake rod 191 by the chain 201 will move the rotors and stators in the brake device 21 into frictional engagement. The two brake devices 20 and 21 will thus be simultaneously operated by hand for braking the vehicle truck.

To release the brakes on the truck when applied by hand the equalizer lever 208 is relieved of manual force whereupon in each brake device 20 and 21 the springs 101 connected to the inner stator 24 will move same and the stator 23 to their release positions and the two rotors 25 and 26 will be moved to their release positions by the springs 60 and 55 as hereinbefore described.

The chains 201 in the connections between the levers 200 carried by brake frame channel 72 and the levers 202 carried by the truck frame end piece 13 provide for free vertical movement of said truck frame relative to the brake frame, as will be apparent.

When the brake 20 is actuated by the brake cylinder pistons 116, it will be noted that movement of the stator 24 in the direction of the associated wheel will act through the connecting rods 196 to rotate the brake rod 190. Likewise when the brake 21 is operated by the brake cylinder pistons 116 the rod 191 is rotated. This rotation of the brake rods 190 and 191 when the brakes 20 and 21 are operated by the brake cylinder piston 116 is of no consequence, but it should be noted that the chain 201 provides for such rotation relative to and thus free of other parts of the hand brake devices.

Description—Figs. 10, 11 and 12

In the embodiment of the invention shown in Figs. 1 to 9 and above described, it will be noted that the brake cylinder devices 63 and brake stators are supported on the journal box bearings 9 through metal to metal connections and are thus subject directly to vibration of the truck wheels 4 on the rails 5. If desired these parts of the brake mechanism may be substantially insulated against such vibration by any suitable disposition of shock absorbing means, such as rubber cushions, in the connections between said parts and the journal box bearings 9.

One means of accomplishing this end is disclosed in Figs. 10, 11 and 12 of the drawings.

According to this embodiment a brake support end bearing ring 211 and brake support frame end piece 212 are substituted for the corresponding parts 161 and 158 above described. The bearing ring 211 is carried by the journal box bearing 9 the same as ring 161, but the central opening through the end piece 212 is of greater diameter than the outside diameter of the ring 211 in order to provide an annular space 213 between the two parts. Blocks 214 of resilient material, such as rubber, are disposed in this space for carrying the end piece. These blocks 214 are equally spaced apart around the ring 211 and are held in place by frictional contact between said ring and the end piece 212 and by shoulders 215 and 216 provided on said end piece and ring and overlapping the opposite ends of the blocks.

It will be apparent that the resilience of the rubber blocks 214 will absorb vibration of the truck wheels 4 and thus minimize the transfer of vibration and shock to the brake cylinder devices and stators of the brake mechanism. By spacing the blocks 214 from each other, they are free to flow under shock in the direction of each other as well as out of the space 213 in order to obtain the maximum degree of benefit from the resilient characteristic of the blocks.

The blocks 214 are held in spaced relation to each other by a metal spacer 217 disposed between each two adjacent blocks and secured by a rivet 218 to the end piece. These metal spacers 217 have a central portion 219 extending into the space 213 but not contacting the blocks 214. These central portions 219 are provided for contacting the bearing ring 211 in case of excessive shock in order to limit displacement of the rubber blocks 214 to such a degree as to avoid damage thereto.

Description—Figs. 13 and 14

In this modification, vibration absorbing means are arranged in the brake supporting frame at the opposite ends of the channels 72. This absorbing means comprises a rubber block 222 having a plate 223 bonded to one of its vertical faces and a plate 224 bonded to the opposite face. The plate 223 has at one end a right angle part 225 secured to the end of channel 72 by bolts 226, while the plate 224 has on its outer face an outstanding part 227 secured by bolts 228 to the adjacent end of a connecting member 229 which is similar to the connecting member 164 above described. The rubber blocks 222 constitute the support for the brake cylinder devices 63, the brake stators and the channels 72 and as will be apparent will absorb vibration of the wheels 4 and thus minimize the transfer of such vibration to said brake cylinder devices, stators and the channels.

Bolts 230 extend through suitable bores in the plate 223 and slots 231 in the rubber block 222 and plate 224. The heads 232 of these bolts are welded to the plate 223 while on the opposite end of each bolt is provided a washer 233 having sliding contact with the plate 224 and held in place by a nut 234.

In operation it will be apparent that the plate 224 which is connected to the brake frame end piece 158 is capable of moving vertically with the truck wheel 4 relative to the plate 223 and bolts 230 for absorbing vibration. In case of extreme vibration it will be noted that the plate 224 may contact the bolts 230 the purpose of which is to limit the shear stress in the rubber block 222 under such an abnormal condition.

Description—Figs. 15 and 16

This structure differs from that just described only in the specific type of shock absorbing device employed at the ends of brake supporting channels 72.

This shock absorbing device comprises a rubber bushing 236 having its inner and outer surfaces bonded to metal sleeves 237 and 238 respectively. A support sleeve 239 is slidably mounted on the sleeve 238 and rests on an outturned shoulder 240 provided at the lower end of sleeve 238. The sleeve 239 is welded to one end of two oppositely disposed brackets 241 the opposite ends of which are welded to the channel 72.

In this embodiment a connecting member 242 is secured to the end piece 158 in place of the member 164 above described and at the end of this member 242 are two spaced jaws 243 arranged one above and one below the metal sleeve 237. Between each end of the sleeve 237 and the adjacent jaw 243 is a washer 244. A bolt 245 extends through these jaws, the washers 244 and sleeve 237 rigidly securing said sleeve to the end piece 242. Adjacent each jaw 243 the washer 244 has an annular collar 246 arranged for contact with the adjacent end of sleeve 238.

The rubber bushing 236 provides for the absorption of vibration of the truck wheel 4, while engagement between the sleeve 238 and one or the other annular collars 246 on the washers 244 will limit the distortion of said bushing under extreme shock.

Summary

It will now be seen that the improved brake mechanism comprises two oppositely disposed brake devices, one located adjacent each of two oppositely arranged wheels of a wheel and axle structure or assembly of a railway vehicle truck, and both devices are arranged for simultaneous operation either by power or by hand for braking the wheel and axle structure.

The structure including the rotors of each brake device is secured to turn with the wheel and axle assembly through the medium of the connection with the ends of the wheel connecting axle tube. The relatively stationary parts of both brake devices are supported at all times in braking relation with the rotors by a rigid structure extending around both sides of both wheels and along the opposite sides of and parallel to the axle tube connecting the wheels, and this structure is supported at its opposite ends on the inboard ends of the two journal boxes which are located outboard of the two wheels. This brake supporting structure has a torque connection with the truck frame and the supports for the structure on the journal bearings are in the form of journals around which the structure may turn, to accommodate the structure to vertical movement of the truck frame.

Due to the torque ring 28 being spaced from the axle tube throughout the major portion of its length, and due to the fan action of ribs 33 projecting from said ring, as well as to the radial spaces existing between the brake shoes on the rotors 25 and 26, a forced outward circulation of air is provided upon rotation of the wheels and rotors for dissipating heat from the rotors and stators incident to braking. Such outward movement of air currents is also facilitated by the relatively large openings around the periphery of the brake elements between the arms 86 and 88 projecting from the stator 22 and between the arms 93 and 97 projecting from the stator 24.

The arms 86 and 88 and the plates 66 connecting the brake cylinder device 63 to the stator element 22 in each of the two brake devices provides a relatively compact, strong, and rigid structure for carrying the movable stator elements 23 and 24. Moreover, the relatively wide and preferably radially formed bearing surfaces between the different movable parts of the brakes provide for long useful life thereof.

Of importance is the fact that all parts of the brake mechanism except the end support members 158 may be applied to a wheel and axle assembly with the wheels in place on the axle. The support members 158 are preferably made in one piece and therefore need be applied to the journal boxes before mounting the journal boxes on the axle. In assembling the mechanism the holes in which the bolts 165 are disposed in one end of the two channels 72 are not drilled until after the support members 158 and 164 to be connected thereto are in place so as to thereby enable locating said holes so that movement of the brake supporting structure relative to the wheel and axle assembly lengthwise thereof will not exceed a certain permissible degree.

Having now described my invention, what I claim as new and desire to secure by Letters Patent, is:

1. In a railway car truck having a frame, a wheel and axle structure including two spaced wheels, two coaxially aligned journal bearings carried by said structure and carrying said frame, a brake for one of said wheels comprising rotor means arranged in coaxial relation with the one wheel and secured to rotate therewith, stator means arranged to frictionally engage said rotor means, rigid support means carrying said stator means and extending between and carried wholly by both of said journal bearings, means in the connection between said support means and journal bearings providing for movement of said support means about the axis of said journal bearings, and torque means having a connection with said stator means and operative only to hold same against rotation.

2. In a railway car truck having a frame, a wheel and axle structure including two spaced wheels, two coaxially aligned journal bearings carried by said structure and carrying said frame, a brake for one of said wheels comprising rotor means arranged in coaxial relation with the one wheel, stator means for frictionally engaging said rotor means, actuating means for said stator means, means securing said rotor means to rotate with said wheel, rigid support means for said stator means and actuating means extending between and carried wholly by said journal bearings, means in the connection between said support means and journal bearings providing for movement of said support means about the axes of said journal bearings, and torque means connected to said support means and operative only to secure said support means and thereby said stator means against rotation.

3. In a railway car truck having a frame, a wheel and axle structure including two spaced wheels, two coaxially aligned journal bearings carried by said structure and carrying said frame, a brake for one of said wheels comprising rotor means arranged in coaxial relation with said wheel and secured to rotate therewith, stator means for frictionally engaging said rotor means, support means for said stator means, the weight of said support means and stator means being substantially equally divided at opposite sides of the axis of said wheel and axle structure, rigid means carrying said support means and stator means and extending between and having support connections with said journal bearings providing for movement of said rigid means about the axis of said wheel and axle structure, and torque means connected to said support means and operative only to hold said support means and thereby said stator means against rotation.

4. In a railway car truck having a frame, a wheel and axle structure including two spaced wheels, and two coaxially aligned journal bearings carried by said structure and carrying said frame, in combination, a brake for one of said wheels comprising rotor means arranged in coaxial relation with said wheel and secured to rotate therewith, stator means arranged to frictionally engage said rotor means to brake said wheel, torque means connected to said stator means for holding same against rotation, support means carried by said journal bearings supporting said stator means independently of said torque means, and means in the connection between said support means and journal bearings providing for movement of said stator means about the axis of said wheel and axle structure.

5. In a railway car truck having a frame, a wheel and axle structure including two spaced wheels, and two coaxially aligned journal bearings carried by said structure and carrying said frame, in combination, a brake for one of said wheels comprising rotor means arranged in coaxial relation with the wheel and secured to rotate therewith, stator means arranged to frictionally engage said rotor means to brake said wheel, actuating means for said brake, torque means connected to said stator means for holding same against rotation, rigid support means for said stator means and actuating means extending between and carried by said journal bearings and supporting said stator means and actuating means independently of said torque means, and means in the connection between said support means and journal bearings providing for movement of said support means and stator means about the axis of said wheel and axle structure.

6. In a railway car truck having a frame, a wheel and axle structure including two spaced wheels, and two coaxially aligned journal bearings carried by said structure and carrying said frame, in combination, a brake for one of said wheels comprising rotor means secured to rotate with said one wheel and stator means arranged to frictionally engage said rotor means to brake said wheel, actuating means for said brake, torque means connected to said stator means for holding same against rotation, support means carrying said stator means and actuating means, the weight of said support means, stator means, and actuating means being substantially equally distributed at the opposite sides of the axis of said wheel and axle structure, means supporting said support means on said journal bearings independently of said torque means, and means in the connections between the last named means and said journal bearings providing for movement of said support means and thereby said stator means about the axes of said journal boxes.

7. In a railway car truck having a frame, a wheel and axle structure including two spaced wheels, and two coaxially aligned journal bearings carried by said structure and carrying said frame, in combination, a brake for one of said wheels comprising annular rotor means and annular stator means arranged in coaxial relation with said one wheel, means securing said rotor means to rotate with said wheel, torque means connected to said stator means securing same against rotation, a rigid carrying structure extending between and supported on said journal bearings, means connecting said stator means at opposite sides of its axis to said carrying structure for supporting same from said journal bearings independently of said torque means, and means in the supporting connections of said carrying structure with said journal bearings providing for movement of said carrying structure and thereby of said stator means about the axis of said wheel and axle structure.

8. In a railway car truck having a frame, a wheel and axle structure including two spaced wheels, and two coaxially aligned journal bearings carried by said structure and carrying said frame, in combination, a brake for one of said wheels comprising annular rotor means and annular stator means arranged in coaxial relation with said wheel and operative upon frictional interengagement to brake said wheel, actuating means for said brake means securing said rotor means to rotate with said wheel, torque means connected to said stator means securing same against rotation, a carrying structure for said stator means and actuating means, said carrying structure, stator means and actuating means being so arranged that the combined weight is substantially equally divided at opposite sides of the axis of said wheel and axle structure, means connecting said carrying structure with said journal bearings providing a two point support therefor, which is independent of said torque means, and means in the connection between the last named means and said journal bearings providing for movement of said carrying structure and thereby of said stator means about the axis of said wheel and axle structure.

9. In a railway car truck having a frame, two coaxially aligned journal bearings carrying said frame, wheel and axle supporting means carrying said journal bearings and comprising two spaced wheels, in combination, a brake for each of said wheels comprising annular rotor means secured to rotate with the wheel in coaxial relation therewith, stator means adapted to cooperate with said rotor means to brake said wheel, actuating means for each brake, torque means connected to said stator means in both brakes for holding same against rotation, rigid support means extending between and carried by said journal bearings and carrying said stator means and actuating means of both brakes independently of said torque means, and means in the connections between said support means and journal bearings providing for movement of said support means and thereby of said stator means of both brakes around the axes of said journal bearings.

10. In a railway car truck having a frame, two coaxially aligned journal bearings carrying said frame, and wheel and axle supporting means carrying said journal bearings and comprising two spaced wheels, in combination, a brake for each of said wheels comprising an annular rotor and an annular stator arranged in coaxial relation with the wheel and adapted to frictionally engage to brake said wheels, means securing said rotor to rotate with said wheel, actuating means for each of said brakes, rigid support means extending between and carried wholly by said journal bearings and carrying said actuating means, means connecting opposite sides of said annular stator to said support means for carrying said stator, the connection between said support means and said journal bearings providing for movement of said support means and stators about the axes of said journal bearings, and torque means connected to said support means for holding same and thereby the stators of both brakes against rotation.

11. In a railway car truck having a frame, a wheel and axle structure including two spaced wheels, and two coaxially aligned journal bearings carried by said structure and carrying said frame, in combination, a brake for one of said wheels comprising rotor means arranged in coaxial relation with the one wheel and secured to rotate therewith, stator means adapted to frictionally engage said rotor means to brake said wheel, torque means connected to said stator means for holding same against rotation, and rigid support means extending between and journaled on said journal bearings supporting said stator means, said support means and stator means being so arranged that the weight thereof is equally distributed at opposite sides of the axis of said wheel and axle structure so as to be carried by said bearings independently of said torque means.

12. In a railway car truck having a frame, two coaxially aligned journal bearings carrying said frame, and wheel and axle supporting means carrying said bearings and comprising two spaced wheels one disposed adjacent the inboard face of each of said journal boxes, in combination, a brake for one wheel of said structure disposed inboard of the wheel and comprising rotor means arranged in coaxial relation with said wheel and secured to rotate therewith, stator means for frictionally engaging said rotor means, torque means operative to hold said stator means against rotation, rigid support means extending between and connected to both of said journal boxes carrying said stator means independently of said torque means, and means in the connection between said support means and both journal bearings providing for movement of said support means and stator means about the axes of said journal bearings.

13. In a railway car truck having a frame, two coaxially aligned journal bearings carrying said frame, and wheel and axle supporting means carrying said bearings and comprising two spaced wheels one disposed adjacent the inboard face of each of said journal boxes, in combination, a brake for one of said wheels disposed inboard thereof and comprising annular rotor means secured to rotate with the wheel, stator means adapted to frictionally engage said rotor means to brake said wheel, actuating means for said stator means, a rigid supporting structure extending between and carried by both of said journal bearings carrying said stator means and actuating means which are so arranged that the weight thereof and of said structure is substantially equally divided at opposite sides of the axes of said journal bearings, the carrying connection between said structure and journal bearings providing for movement of said structure about the axes of said journal bearings, and torque means connected to said structure for holding same and thereby said stator means against rotation.

14. In a railway car truck having a frame, in combination, two coaxially aligned journal bearings carrying said frame, wheel and axle supporting means carrying said bearings and comprising two spaced wheels located inboard of said boxes, a brake for one of said wheels comprising rotor means and stator means, means securing said rotor means to rotate with said one wheel, a rigid structure carried by said journal bearings and extending therebetween around both sides of both wheels and carrying said stator means, the connections between said structure and journal bearings providing for movement of said structure and stator means about the axes of said journal bearings, and torque means connected with said structure for holding same and thereby said stator means against rotation.

15. In a railway car truck having a frame, in combination, two coaxially aligned journal bearings carrying said frame, wheel and axle supporting means carrying said bearings and comprising two wheels located inboard of said boxes, a brake for one of said wheels comprising rotor means and stator means adapted to cooperate to effect braking of said wheel, means securing said rotor means to rotate with said wheel, a rigid support for said stator means comprising two oppositely disposed end pieces, one of which is carried by each of said journal boxes, each of said end pieces having two oppositely disposed horizontally extending arms, two side pieces one disposed at each of the opposite sides of the axis of said wheel and axle supporting means and connected at opposite ends to the horizontally extending arms of said end pieces, means securing said stator means to both of said side pieces, the connections between said end pieces and journal bearings providing for movement of said side pieces about the axis of said wheel and axle supporting means, and means connecting said structure to said truck frame for holding same and thereby said stator means against rotation.

16. In a railway car truck having a frame, in combination, two coaxially aligned journal bearings carrying said frame, wheel and axle supporting means carrying said bearing and comprising two wheels located inboard of said boxes, a brake for one of said wheels comprising rotor means and stator means adapted to cooperate to effect braking of said wheel, means securing said rotor means to rotate with said one wheel, and a rigid rectangular-like structure extending between said journal bearings around the opposite sides of both wheels and carrying said stator means, means connecting said structure with said journal bearings providing for movement thereof and of said stator means about the axes of said journal bearings, and means connecting said structure to said truck frame for holding same and thereby said stator means against rotation.

17. In a railway car truck having a frame, in combination, two coaxially aligned journal bearings carrying said frame, wheel and axle supporting means carrying said bearings and comprising two wheels one located adjacent the inboard face of each of said journal bearings, a brake for each of said wheels comprising rotors and stators adapted to cooperate for braking the wheel, means securing the said rotor of each brake to the adjacent wheel for rotation therewith, a structure extending around the opposite sides of both said wheels and carried by said journal boxes, means securing said stator means to said structure at the opposite sides of the axis of said wheel and axle supporting means, the weight of said structure and stator means being substantially equally divided at the opposite sides of the axis of said wheel and axle supporting means, means in the connections between the said structure and journal bearings providing for movement of said structure and stator means about the axis of said journal bearings, and torque means connecting said structure with said truck frame.

18. In a railway car truck having a frame, two coaxially aligned journal bearings carrying said frame, and wheel and axle supporting means carrying said bearings and comprising two spaced wheels one disposed adjacent each of said bearings, in combination, a brake for one of said wheels comprising rotor means and stator means adapted to cooperate to effect braking of the wheel, actuating means for said brake, a brake support bearing associated with each of said journal bearings in coaxial relation therewith, a rigid structure extending between and journaled on said brake supporting bearings carrying said stator means and actuating means, torque means connected with said structure for holding said stator means against rotation, the weight of said rigid structure, said stator means and actuating means being substantially equally divided at opposite sides of the axis of said wheel and axle supporting means and thereby carried on said journal bearings independently of said torque means.

19. In a railway car truck having a frame, in combination, two coaxially aligned journal bearings carrying said frame, wheel and axle supporting means carrying said journal bearings and comprising two wheels spaced apart with one disposed adjacent the inboard end of each of said bearings, a brake for one of said wheels comprising annular rotor means secured to rotate with the wheel and annular stator means adapted to cooperate with said rotor means for braking said wheel, and a structure carrying said stator means in cooperative relation with said rotor means comprising two side pieces one disposed at each of the two opposite sides of the axis of said wheel and axle supporting means and extending parallel to said axis, means securing said stator means to both of said side pieces for support, two end pieces one of which is disposed between each of said wheels and the inboard end of the adjacent journal bearing having two oppositely disposed horizontally extending arms, means connecting the opposite ends of said arms around the opposite sides of the adjacent wheel to the adjacent ends of said side pieces for supporting said side pieces from said end pieces, means associated with each of said journal bearings supporting the adjacent one of said end pieces and providing for movement thereof in a direction around the axis of such bearing, and means connecting one of said side pieces to said truck frame for holding said stator support structure against rotation.

20. In a railway car truck having a frame, in combination, two coaxially aligned journal bearings carrying said frame, wheel and axle supporting means carrying said journal bearings, a brake comprising rotor means secured to rotate with said supporting means, stator means disposed to cooperate with said rotor means for braking said wheel and axle supporting means, a rigid structure carrying said stator means, means associated with each of said journal bearings providing a support for one end of said structure and providing for movement of said structure relative to said journal bearings about the axes thereof, means connecting said structure with said truck frame for holding said stator means against rotation, said stator means comprising at each of the opposite sides of the axis of said wheel and axle supporting means a fluid actuated brake cylinder means, a fluid pressure supply and release pipe connected to one of said brake cylinder means, and another pipe connecting said one brake cylinder means to the other brake cylinder means, the last named pipe following the contour of said structure from the one brake cylinder means over the journal bearing support at one end of said structure to the other of said brake cylinder means.

21. In a railway car truck having a frame, in combination, two coaxially aligned journal bearings carrying said frame, wheel and axle supporting means carrying said bearings and comprising two wheels spaced apart with one disposed adjacent each of said bearings, a brake for each of said wheels comprising rotor means secured to rotate with the wheel and stator means adapted to cooperate with said rotor means for braking said wheel, two rigid side members one disposed at each of the opposite sides of the axis of said wheel and axle supporting means and extending parallel thereto, means supporting said stator means of both of said brakes from said side members, two end pieces one supported on each of said journal bearings and capable of movement about the axis of such bearing, each of said end pieces having two oppositely disposed horizontally extending arms, means connecting the opposite ends of said side members to the ends of the adjacent arms of said end pieces for thereby supporting said stator means on said journal bearings, torque means connecting one of said side members to said truck frame for holding said stator means against rotation, each of said stator means comprising two brake cylinder means one located at each of the opposite sides of the axis of said wheel and axle supporting means, a pipe connecting the two brake cylinder means at one side of said axis, said pipe being carried by one of said side members, a second pipe constituting a fluid pressure supply and release pipe connected to the first named pipe, and other pipes connecting the two brake cylinder means in each stator means, each of the last two pipes extending from the two respective brake cylinder means along the two side members and the adjacent end piece and around the journal support bearing therefor, and being carried by said side members and end piece.

22. In a railway car truck having a truck frame, a rotatable wheel and axle assembly, a normally stationary axle supported in said rotatable axle, and a journal bearing on each of the opposite ends of said stationary axle outboard of the wheels of said assembly and carrying said truck frame, in combination, a brake for each of said wheels located adjacent the inboard face thereof and comprising annular rotor means secured to rotate with the wheel in coaxial relation therewith, annular stator means arranged in coaxial relation with each of said rotor means and adapted to cooperate therewith to effect braking of the wheel, a structure for supporting the said stator means of the two brakes comprising rigid side pieces one disposed at each of the opposite sides of the axis of said wheel and axle assembly and extending parallel thereto, an end piece disposed between each of said journal boxes and the adjacent wheel and having two opposite outwardly extending horizontal arms, means connecting said arms to the adjacent ends of said side members for thereby supporting said side members and stator means from said end pieces, means associated with the inboard end of each of said journal bearings supporting the adjacent end piece and thereby providing a two point support for said structure, the connections between each end piece and the said means associated with said journal bearings providing for movement of said structure about the axes of said journal bearings, and means connecting one of said side members to said frame for holding said brake supporting structure and stator means against rotation.

23. In a railway car truck having a truck frame, a rotatable wheel and axle assembly, a normally stationary axle supported in said rotatable axle, and a journal bearing on each of the opposite ends of said stationary axle outboard of the wheels of said assembly and carrying said truck frame, in combination, a brake for each of said wheels located adjacent the inboard face thereof and comprising annular rotor means secured to rotate with the wheel in coaxial relation therewith, annular stator means arranged in coaxial relation with each of said rotor means and adapted to cooperate therewith to effect braking of the wheel, a structure for supporting the said stator means of the two brakes comprising rigid side pieces one disposed at each of the opposite sides of the axis of said wheel and axle assembly and extending parallel thereto, an end piece disposed between each of said journal boxes and the adjacent wheel and having two opposite outwardly extending horizontal arms, means connecting said arms to the adjacent ends of said side members for thereby supporting said side members and stator means from said end pieces, a sleeve-like extension at the inboard end of each of said journal bearings providing a cylindrical bearing surface, the adjacent one of said end pieces being journaled on said surface to thereby provide a two point support for said structure and the stator means carried thereby, and torque means connecting one of said side members to said truck frame for holding said structure and stator means against rotation.

24. In a railway car truck having a frame, two coaxially aligned journal bearings carrying said frame, and a wheel and axle supporting structure carrying said bearings, in combination, a brake for said wheel and axle supporting structure comprising rotor means secured to rotate therewith and stator means disposed to cooperate with said rotor means, a rigid structure carrying said stator means extending between and having supporting connections with said journal bearings, said connections providing for movement of said structure around the axes of said bearings, displaceable resilient means included in said structure between said journal bearings and stator means for absorbing vibration of said wheel and axle supporting structure, and non-resilient stop means associated with a part of said structure at one side of said resilient means and cooperative with a part of said structure at the opposite side of said resilient means to limit displacement of said resilient means upon abnormal vibration of said wheel and axle supporting structure.

25. In a railway car truck having a frame, two coaxially aligned journal bearings carrying said frame, and a wheel and axle supporting structure carrying said journal bearings, in combination, a brake for said wheel and axle supporting structure comprising rotor means secured to rotate therewith, and stator means disposed to cooperate with said rotor means, an annular stator means support extension on each of said journal bearings, a rigid structure carrying said stator means and extending between said journal bearings and having end pieces disposed for support by said extensions, each of said end pieces comprising one part carrying said stator means and a second part carried by the adjacent journal bearing, the two parts of each end piece having adjacent concentric surfaces spaced from each other, and a plurality of resilient members spaced from each other and extending between and connecting said concentric surfaces in each end piece for supporting said stator means carrying structure and for absorbing vibration of said wheel and axle supporting means.

26. In a railway car truck having a frame, two coaxially aligned journal bearings carrying said frame, and a wheel and axle supporting structure carrying said journal bearings, in combination, a brake for said wheel and axle supporting structure comprising rotor means secured to rotate therewith, and stator means disposed to cooperate with said rotor means, a brake support extension on each of said journal bearings, a rigid structure carrying said stator means extending between said journal bearings and having end pieces encircling said extensions, each of said end pieces comprising an outer portion rigidly connected with said stator means, and an inner portion carried by the respective brake support extension and having an exterior cylindrical surface arranged in concentric relation with but spaced inwardly from a like surface on said outer portion, displaceable resilient means comprising a plurality of resilient members interposed between and engaging said surfaces in each end piece for resiliently supporting the stator means carrying structure from said journal bearings, the said resilient members being spaced from each other around said surfaces, and non-resilient stop elements associated with one of said portions of each end piece extending into certain of the spaces provided between the spaced resilient members adapted to engage the other portion of the respective end piece after a chosen degree of displacement of said resilient members for limiting such displacement.

27. In a railway car truck having a frame, two coaxially aligned journal bearings carrying said frame, and a wheel and axle supporting structure carrying said journal bearings, in combination, a brake for said wheel and axle supporting structure comprising rotor means secured to rotate therewith, and stator means disposed to cooperate with said rotor means, a brake support extension on each of said journal bearings, a rigid structure carrying said stator means extending between said journal bearings and having end pieces encircling said extensions, each of said end pieces comprising an outer portion rigidly connected with said stator means, and an inner portion carried by the respective brake support extension and having an exterior cylindrical surface arranged in concentric relation with but spaced inwardly from a like surface on said outer portion, displaceable resilient means comprising a plurality of resilient members interposed between and engaging said surfaces in each end piece for resiliently supporting the stator means carrying structure from said journal bearings, the said resilient members being spaced from each other around said surfaces, and non-resilient stop elements associated with one of said portions of each end piece extending into certain of the spaces provided between the spaced resilient members adapted to engage the other portion of the respective end piece after a chosen degree of displacement of said resilient members for limiting such displacement, said brake support extension on each journal bearing having an exterior, cylindrical bearing surface formed in coaxial relation with the axis of said wheel and axle supporting means, and the inner portion of each end piece having a bearing surface in engagement with that on the respective extension to provide for movement of said end piece and thereby of said rigid stator means supporting structure about the axes of said journal bearings.

28. In a railway car truck having a frame, two coaxially aligned journal bearings carrying said frame, and wheel and axle supporting means carrying said bearings, in combination, a brake for one of said wheels comprising a plurality of rotors secured to rotate with the wheel in coaxial relation therewith, a plurality of stators interleaved with said rotors, brake cylinder means operable by fluid under pressure to effect axial movement of certain of said rotors and stators in one direction for effecting frictional interengagement between all of said rotors and stators to effect braking of said wheel, a structure extending between and carried by said journal bearings, means connecting said brake cylinder means and stators to said structure for supporting same, springs anchored to said structure and connected to one of said stators for effecting movement of all of said certain stators in the opposite direction to brake release positions, lever means carried by said structure and operatively connected to said brake for effecting axial movement of said certain rotors and stators into frictional interengagement, and hand operated means connected to said lever means for actuating same.

29. In a railway car truck having a frame, two coaxially aligned journal bearings carrying said frame, and wheel and axle supporting means carrying said bearings, in combination, a brake for each of said wheels comprising rotor means secured to rotate with the wheel, and stator means arranged to be moved axially into frictional engagement with said rotor means for braking the wheel, power means for each brake for actuating the said stator means thereof, means securing said rotor means of both brakes to rotate with said wheel and axle supporting means in coaxial relation therewith, a structure comprising two side pieces one disposed at each of the opposite sides of said wheel and axle supporting means and extending parallel to the axis thereof, two end pieces one carried by each of said journal bearings, means connecting said side pieces to said end pieces for support, means connecting said stator means and power means of both brakes to said side pieces for supporting same, a rockable operating rod for each of said brakes extending between both of said side pieces and having journal connections therewith, means operatively connecting one of said rods to one of said brakes for rendering said rod operable upon rocking to actuate the connected brake, actuating means connecting the other rod to the other brake, and hand operated means connected to both of said rods for simultaneously actuating same.

30. In a railway car truck having a frame, two coaxially aligned journal bearings carrying said frame, and wheel and axle supporting means carrying said bearings, in combination, a brake for each of said wheels comprising rotor means secured to rotate with the wheel, and stator means arranged to be moved axially into frictional engagement with said rotor means for braking the wheel, power means for each brake for actuating the said stator means thereof, means securing said rotor means of both brakes to rotate with said wheel and axle supporting means in coaxial relation therewith, a structure comprising two side pieces one disposed at each of the opposite sides of said wheel and axis supporting means and extending parallel to the axis thereof, two end pieces one carried by each of said journal bearings, means connecting said side pieces to said end pieces for support, means connecting said stator means and power means of both brakes to said side pieces for supporting same, a rockable operating rod for each of said brakes extending between both of said side pieces and having journal connections therewith, means operative connecting one of said rods to one of said brakes for rendering said rod operable upon rocking to actuate the connected brake, actuating means connecting the other rod to the other brake, lever means carried by said truck frame, flexible operating means connecting said lever means with said rods, and hand operated means on said truck frame connected to the lever means for simultaneously operating both of said rods to actuate said brakes.

31. In a railway car truck having a frame, two coaxially aligned journal bearings carrying said frame, and wheel and axle supporting means carrying said bearings, in combination, a brake for each of said wheels comprising rotor means secured to rotate with the wheel, and stator means arranged to be moved axially into frictional engagement with said rotor means for braking the wheel, power means for each brake for actuating the said stator means thereof, means securing said rotor means of both brakes to rotate with said wheel and axle supporting means in coaxial relation therewith, a structure comprising two sides pieces one disposed at each of the opposite sides of said wheel and axle supporting means and extending parallel to the axis thereof, two end pieces one carried by each of said journal bearings, means connecting said side pieces to said end pieces for support, means connecting said stator means and power means of both brakes to said side pieces for supporting same, a rockable operating rod for each of said brakes extending between both of said side pieces and having journal connections therewith, means operatively connecting one of said rods to one of said brakes for rendering said rod operable upon rocking to actuate the connected brake, actuating means connecting the other rod to the other brake, hand operated means connected to both of said rods for simultaneously actuating same, and release springs for each brake, each of said springs being anchored at one end on one of said side pieces and connected at the opposite end to the stator means of the respective brake for urging such stator means out of contact with the rotor means of the brake upon release of said power means and hand operated means.

32. A disk brake for a rotatable member comprising a pile of one fixed and one axially movable stator disks and one interleaved axially movable rotor disk, means securing said rotor disk to turn with said member, brake cylinder means comprising a stationary part and a part carried by said stationary part and capable of movement relative thereto under the action of fluid pressure to move said axially movable stator disk and rotor disk axially in the direction of the fixed stator disk to effect frictional interengagement between all of said disks to brake said member, means supporting said stationary part of said brake cylinder means, arms spaced around and projecting from the periphery of said fixed stator disk and engaging said stationary part of said brake cylinder means, means securing the ends of said arms to said stationary part of said brake cylinder means for supporting said fixed stator disk and for holding same against rotation relative to said fixed part of said brake cylinder means, arms projecting from said axial movable stator disk cooperative with said fixed part of said brake cylinder means for supporting said axially movable stator disk and for holding same against rotation but providing for axial movement thereof, and means connecting the last named arms to said movable part of said brake cylinder means.

33. A disk brake for a rotatable member comprising a pile of one fixed and one axially movable stator disks and one interleaved axially movable rotor disk, means securing said rotor disk to turn with said member, brake cylinder means comprising a stationary part and a part carried by said stationary part and capable of movement relative thereto under the action of fluid pressure to move said axially movable stator disk and rotor disk axially in the direction of the fixed stator disk to effect frictional interengagement between all of said disks to brake said member, means supporting said stationary part of said brake cylinder means, arms spaced around and projecting from the periphery of said fixed stator disk and engaging said stationary part of said brake cylinder means, means securing the ends of said arms to said stationary part of said brake cylinder means for supporting said fixed stator disk and for holding same against rotation relative to said fixed part of said brake cylinder means, arms projecting from said axial movable stator disk cooperative with said fixed part of said brake cylinder means and with said arms projecting from said fixed stator disk for supporting said axially movable stator disk and for holding same against rotation but providing for axial movement of said axially movable disk, and actuating means for said axially movable disk connecting same to said movable part of said brake cylinder means.

34. A disk brake for a rotatable member comprising a pile of two stator disks and an interleaved axially movable rotor disk, one of said stator disks being fixed and the other being axially movable in the direction of said fixed stator disk, annular brake cylinder means encircling said pile of disks and comprising a fixed part and a part carried by said fixed part and adapted to be moved in the direction of said fixed stator disk under the action of fluid pressure to effect movement of the axially movable disks in the direction of said fixed disk to obtain frictional interengagement therebetween for braking said member, rigid means connecting said fixed stator disk to said fixed part of said brake cylinder means for supporting said fixed stator disk and for holding same against rotation, other rigid means connected with said axially movable stator disk and interlocked with said fixed part of said brake cylinder means for supporting the disk and for holding same against rotation and providing for axial movement of the disk, and means connecting said other rigid means with said relatively movable part of said brake cylinder means for rendering same effective.

35. A disk brake for a rotatable member comprising a pile of two stator disks and one interposed rotor disk, means securing said rotor disk to turn with said member, annular brake cylinder means arranged in coaxial relation with said disks and comprising a casing, means secured to said casing for supporting same, arms projecting from one of said stator disks and extending parallel to the axis thereof and rigidly secured to said casing for supporting the stator disk and for holding same against axial movement relative to said casing, piston means in said casing adapted to be moved under the action of fluid pressure, arms projecting from the periphery of the other stator disk having portions extending parallel to the axis thereof and cooperative with portions of said brake cylinder casing for supporting the disk and for holding same against rotation relative to the casing and providing for axial movement of the disk in the direction of and away from the other stator disk, and means connecting the last named arms to said piston means for thereby rendering said piston means operative under the action of fluid pressure to move the stator disk connected to the last named arms in the direction of the other stator disk to thereby force said pile of disks into frictional interengagement for braking said member.

36. A disk brake for a rotatable member comprising a pile of two stator disks and one interleaved rotor disk, means securing said rotor disk to turn with said member, a plurality of spaced arms arranged around and spaced from the periphery of said pile of disks and extending parallel to the axis thereof, annular brake cylinder means encircling a portion of said pile and comprising a fixed casing and movable piston means therein, certain of said arms being integrally connected at one end with one of said stator disks and being rigidly secured to said casing at the opposite end, said casing having bearing surfaces extending in a generally radial direction, the other of said arms being rigidly connected at one end with the other of said stator disks and being slidable on said bearing surfaces to provide for axial movement of the said other stator disk in the direction of the said one stator disk and for supporting said other stator disk and securing same against turning relative to said casing, and rigid means connecting the last named arms to said piston means to thereby render said piston means operative under the action of fluid pressure to move the said other stator disk and said rotor disk axially in the direction of said one stator disk to effect frictional interengagement therebetween for braking said member.

37. A disk brake for a rotatable member comprising a pile of at least three stator disks and two interleaved and coaxially aligned rotor disks, the stator disk at one end of said pile constituting a fixed stator disk and all other disks being movable axially in the direction of said fixed disk, annular brake cylinder means arranged in concentric relation with said pile of disks and comprising a casing and piston means therein, spaced arms rigidly secured at one end to said fixed stator disk and extending over the periphery of said pile of disk and rigidly secured at the opposite end to said brake cylinder casing, spaced arms projecting from the axially movable stator disk at the opposite end of the pile and having a portion extending parallel to the axis thereof and cooperative with surfaces on said brake cylinder casing for supporting the stator disk and for securing same against rotation relative to said casing but providing for axial movement thereof, the last named arms having outwardly extending portions disposed for engagement by said piston means to thereby render said piston means operative under the action of fluid pressure to move the connected stator disk and the intermediate disks axially in the direction of said fixed stator disk to obtain frictional interengagement between the disks for braking said member, and means projecting from the periphery of the intermediate stator disk and cooperative with certain of said arms for supporting the disk and for holding same against rotation and providing for axial movement thereof.

38. A disk brake for a rotatable member comprising a pile of at least three stator disks and two interleaved and coaxially aligned rotor disks, the stator disk at one end of said pile constituting a fixed stator disk and all other disks being movable axially in the direction of said fixed disk, annular brake cylinder means arranged in concentric relation with said pile of disks and comprising a casing and piston means therein, spaced arms rigidly secured at one end to said fixed stator disk and extending over the periphery of said pile of disks and rigidly secured at the opposite end to said brake cylinder casing, spaced arms projecting from the axially movable stator disk at the opposite end of the pile and having a portion extending parallel to the axis thereof and cooperative with surfaces on said brake cylinder casing for supporting the stator disk and for securing same against rotation relative to said casing but providing for axial movement thereof, the last named arms having outwardly extending portions disposed for engagement by said piston means to thereby render said piston means operative under the action of fluid pressure to move the connected stator disk and the intermediate disks axially in the direction of said fixed stator disk to obtain frictional interengagement between the disks for braking said member, and spaced portions projecting from the periphery of the intermediate stator disk into spaces between the first named arms and having sliding contact therewith, other portions extending from the periphery of the intermediate stator disk into spaces provided between the second named arms and having sliding contact therewith, said portions of said intermediate stator disk cooperating with said arms to provide a support for said intermediate stator disk from both the other stator disks and for securing said intermediate stator disk against rotation relative to the other stator disks.

39. A disk brake for a rotatable member comprising a pile of braking disks including rotor disks and at least two stator disks arranged in interleaved relation and capable of axial movement in one direction into frictional interengagement for braking said member and in the opposite direction to brake release positions, spring means acting on one of said stator disks for urging same to its brake release position, release means associated with said one stator disk operative upon movement thereof to its brake release position to engage and pull the other stator disk to its release position, and stop means arranged for engagement by said other stator disk to define its release position, said release means cooperating with said other stator disk in its release position to define the release position of the said one stator disk.

40. A disk brake for a rotatable member comprising a pile of braking disks including rotor disks and at least two stator disks arranged in interleaved relation and capable of axial movement in one direction into frictional interengagement for braking said member and in the opposite direction to brake release positions, spring means acting on one of said stator disks for urging same to its brake release position, release means associated with said one stator disk operative upon movement thereof to its brake release position to engage and pull the other stator disk to its release position, and stop means arranged for engagement by said other stator disk to define its release position, said release means cooperating with said other stator disk in its release position to define the release position of the said one stator disk, said spring means acting on spaced positions of said one stator disk, said release means being arranged to connect said stator disks at spaced points either side of the lines of action of said spring means, and said stops being arranged to engage said other stator disk at points spaced from said release means.

41. A disk brake for a rotatable member comprising a pile of disks having at one end a fixed stator disk, at the opposite end an axially movable stator disk, and having an intermediate axially movable stator disk, and two axially movable rotor disks interleaved with said stator disks and secured to turn with said member, annular brake cylinder means arranged in coaxial relation with said pile of disks and comprising a fixed part and a relative movable part adapted to be moved under the action of fluid pressure in a direction for moving the axially movable disks toward the fixed stator disk to obtain frictional interengagement between the disks for braking said member, means rigidly connecting said fixed stator disk to said stationary part of said brake cylinder means, means operatively connecting the axially movable stator disk at said opposite end of the pile to said movable part of said brake cylinder means, means providing a connection between said stationary part of said brake cylinder means and the last named stator disk for supporting same and for holding same against rotation and providing for axial movement thereof, means connecting the intermediate stator disk with said fixed part of said brake cylinder means for supporting same and holding same against rotation and providing for axial movement thereof, spring means connected to the axially movable stator disk at said opposite end of said pile operative to urge same to a brake release position upon release of fluid pressure on said movable part of said brake cylinder means, means associated with the last named stator disk operative upon movement thereof to its brake release position for moving said intermediate stator disk to its release position, and means for defining the release positions of said axially movable stator disks.

42. A disk brake for a rotatable member comprising a pile of disks having at one end a fixed stator disk, at the opposite end an axially movable stator disk, and having an intermediate axial movable stator disk, and two axially movable rotor disks interleaved with said stator disks and secured to turn with said member, annular brake cylinder means arranged in coaxial relation with said pile of disks and comprising a fixed part and a relative movable part adapted to be moved under the action of fluid pressure in a direction for moving the axial movable disks toward the fixed stator disk to obtain frictional interengagement between the disks for braking said member, means rigidly connecting said fixed stator disk to said stationary part of said brake cylinder means, means operatively connecting the axially movable stator disk at said opposite end of the pile to said movable part of said brake cylinder means, means providing a connection between said stationary part of said brake cylinder means and the last named stator disk for supporting same and for holding same against rotation and providing for axial movement thereof, means connecting the intermediate stator disk with said fixed part of said brake cylinder means for supporting same and holding same against rotation and providing for axial movement thereof, spring means operative on the axially movable stator disk at said opposite end of the pile for urging same to a brake release position upon release of fluid under pressure on said movable part of said brake cylinder means, spaced members associated with said last named stator disk operative upon movement thereof to its release position for pulling said intermediate stator disk to its brake release position, and stops spaced from said members around said intermediate stator disk and associated with the fixed part of said brake cylinder means for engagement by said intermediate stator disk in its brake release position to define same and cooperative through said intermediate stator disk with said members for defining the release position of said axially movable stator disk at said opposite end of said pile.

43. A disk brake for a rotatable member comprising a pile of braking disks including an inner, fixed stator disk, an outer axially movable stator disk, an intermediate axially movable stator disk, and two rotor disks interleaved with said stator disks in coaxial relation and secured to rotate with said member, annular brake cylinder means encircling a portion of one end of said pile of disks including said outer stator disk, said brake cylinder means comprising a fixed casing and piston means therein adapted to be moved under the action of fluid pressure in the direction of said fixed stator disk, arms projecting from said fixed stator disk over the periphery of said certain of said pile of elements and rigidly connected to said casing for supporting said fixed disk and holding same against rotation, said casing having interiorly a plurality of bearing surfaces spaced from each other and extending generally radially of and parallel to the axis of the brake, said outer stator disk having a plurality of arms slidably engaging said surfaces for supporting the outer stator disk and for holding same against rotation and providing for axial movement thereof in the direction of said fixed stator disk, rigid pressure means connecting the last named arms to said piston means for rendering said piston means operative to move the axially movable disks in the direction of said fixed stator disk to provide frictional interengagement between said disks to brake said member, means projecting from said intermediate stator disk and interlocked with certain of said arms for supporting same and for holding same against rotation and providing for axial movement of the disk, spring means operative on spaced parts of said outer stator disk for urging same in a direction away from said fixed stator disk to a brake release position, a plurality of fingers associated with said pressure means and spaced either side of the connections between said spring means and outer stator disk and operative to move said intermediate stator disk to its brake release position upon release movement of said outer stator disk, and stops associated with said brake cylinder casing disposed to engage parts of said intermediate stator disk at points spaced from the points of contact with said fingers for defining the release position of said intermediate stator disk, said fingers defining the release position of said outer stator disk with said intermediate stator disk in its release position.

44. A brake for a rotatable member comprising an annular rotor disk having on one side a braking face, stator means adapted to frictionally engage said face of said disk to brake said member, actuating means for said stator means, means supporting said stator means and actuating means in cooperative relation with each other and with said rotor disk, and means securing said rotor disk to said member for rotation therewith comprising a ring having on one face a plurality of spaced bosses projecting therefrom for engaging said member to thereby provide spaces between said ring and member and bosses for the flow of air, securing means holding said ring to said member, a plurality of lugs arranged in spaced pairs around said ring and overhanging one end face of said ring, the adjacent faces of each pair of said lugs extending in a generally radial direction and parallel to the axis of the ring, ribs extending in a generally radial direction connecting the said overhanging portions of said lugs with the adjacent end face of said ring for supporting said overhanging portions and adapted to operate upon rotation of said ring with said member to create a forced outward flow of air, said rotor disk encircling said lugs and having a plurality of inwardly extending portions spaced apart and disposed in the spaces between said lugs and having sliding contact with substantially the full radial width of the adjacent faces of each pair of said lugs.

45. A brake for a rotatable member comprising an annular rotor disk having on one side a braking face, stator means adapted to frictionally engage said face of said disk to brake said member, actuating means for said stator means, means supporting said stator means and actuating means in cooperative relation with each other and with said rotor disk, and means securing said rotor disk to said member for rotation therewith comprising a ring having on one face a plurality of spaced bosses projecting therefrom for engaging said member to thereby provide spaces between said ring and member and bosses for the flow of air, securing means holding said ring to said member, a plurality of lugs arranged in spaced pairs around said ring and overhanging one end face of said ring, the adjacent faces of each pair of said lugs extending in a generally radial direction and parallel to the axis of the ring, ribs extending in a generally radial direction connecting the said overhanging portions of said lugs with the adjacent end face of said ring for supporting said overhanging portions and adapted to operate upon rotation of said ring with said member to create a forced outward flow of air, said rotor disk encircling said lugs and having a plurality of inwardly extending portions spaced apart and disposed in the spaces between said lugs and having sliding contact with substantially the full radial width of the adjacent faces of each pair of said lugs, said rotor having in its braking face a plurality of spaced and generally radially extending ducts operative upon rotation of the rotor to create a forced outward flow of air.

46. A brake for a rotatable member comprising an annular rotor disk, stator means adapted upon frictional engagement with said disk to brake said member, actuating means for said brake, means supporting said stator means and actuating means, and means securing said rotor disk to said member for rotation therewith comprising a ring formed in two substantially semicircular sections and arranged on said member in substantial end to end relation, means securing said sections to said member, a plurality of lugs on said ring arranged in pairs and substantially equally spaced apart around said ring and overhanging one face of said ring, the adjacent faces of each pair of lugs being flat and formed generally radially of and parallel to the axis of the ring, a rib connecting the overhanging part of each of said lugs to the adjacent face of said ring for supporting said part and for acting upon rotation of the ring to create an outward flow of air, said rotor encircling said lugs and having a plurality of inwardly extending portions spaced apart to enter the spaces between said lugs and of such form as to having sliding contact over substantially the full radial width of the adjacent faces of each pair of lugs.

47. A brake for a rotatable member comprising stator means, an axially movable rotor disk operative to frictionally engage said stator means to brake said member, actuating means for said rotor disk, means supporting said stator means and actuating means, and means securing said rotor means to turn with said member comprising a ring secured to rotate with said member, a plurality of lugs arranged in spaced pairs around the periphery of said ring, said rotor disk having a plurality of inwardly extending projections one of which is disposed in the space between each pair of said lugs for turning said rotor disk with said member and providing for axial movement of said rotor disk in the direction for frictional contact with said stator means, said rotor disk being movably axially in the opposite direction toward one end of said pair of lugs to a brake release position, a member secured to said one end of one or more of said pairs of lugs, and resilient means carried by said member and connected to said rotor disk and operative to move said rotor disk to its brake release position.

48. A brake for a rotatable element comprising interleaved stator means and a pair of axially movable rotors adapted upon frictional interengagement to brake said element, actuating means for said brake, means supporting said stator means and actuating means, means supporting said rotor means and securing same for rotation with said element comprising a ring, a plurality of lugs arranged around said ring in pairs which are spaced from each other with the spaces extending parallel to the direction of movement of said rotors, each of said rotors encircling said lugs and having a projection disposed in the space between each pair of lugs for supporting the rotor and for turning same with said element, said projections being movable in the direction of one end of said lugs upon axial movement of said rotors by said actuating means and in the direction of the opposite ends of said lugs to brake release position, a member extending between and secured to said opposite ends of a plurality of said pairs of said lugs for engagement by certain of the said projections on the adjacent rotor to define its brake release position, a release bolt carried by each of said members, said bolts having connections with said certain projections of said adjacent rotor for moving same to its release position and other connections with the certain projections of the other rotor for moving it to a brake release position, a spring interposed between each of said members and the respective release bolt for actuating same to move said rotors to their release positions, said other rotor being movable on said bolts in the direction of the said adjacent rotor, and spring means on each bolt resiliently urging said other rotor to its release position with said adjacent rotor in its release position.

49. A brake for a wheel and axle supporting structure of a railway vehicle truck comprising annular rotor means secured to turn with a wheel of said supporting structure, annular stator means for frictionally engaging said rotor means, a substantially annular brake cylinder means for actuating said stator means, and a support element at each of the opposite sides of the axis of said wheel and axle supporting structure carrying said stator means and brake cylinder means, said brake cylinder means comprising two oppositely disposed arcuate sections one disposed at either side of said axis, and each section having a bracket portion substantially midway between the ends thereof mounted against the adjacent one of said support elements, means securing said bracket portions to said support elements, a horizontally extending plate rigidly connecting the ends of said two brake cylinder sections above said axis, and another horizontally extending plate rigidly connecting said two brake cylinder sections below said axis.

50. A brake for a wheel and axle supporting structure of a railway vehicle truck comprising annular rotor means secured to turn with a wheel of said supporting structure, annular stator means for frictionally engaging said rotor means, a substantially annular brake cylinder means for actuating said stator means, and a support element at each of the opposite sides of the axis of said wheel and axle supporting structure carrying said stator means and brake cylinder means, said brake cylinder means comprising two oppositely disposed arcuate sections one disposed at either side of said axis, and each section having a bracket portion substantially midway between the ends thereof mounted against the adjacent one of said support elements, means securing said bracket portions to said support elements, a horizontally extending plate rigidly connecting the ends of said two brake cylinder sections above said axis, and another horizontally extending plate rigidly connecting said two brake cylinder sections below said axis, said support elements being spaced from the axis of said wheel and axle supporting structure a distance equal at least to the radius of said wheel, and the distance between the horizontal portions of said plates and said axis measured at right angles to the plates being less than the radius of said wheel.

51. A brake for a rotatable member comprising annular rotor means secured to rotate with said member, annular stator means for frictionally engaging said rotor means to brake said member, annular brake cylinder means, and two oppositely disposed support elements supporting said stator means and brake cylinder means in cooperative relation with said rotor means, said brake cylinder means comprising two oppositely disposed arcuate sections each having a bracket portion substantially midway between the ends thereof, means securing said bracket portion of each section to one of said support elements, a cylindrical brake cylinder bore at each side of said bracket portion in each brake cylinder section, a brake cylinder piston in each of said bores for actuating said brake, a plate overlapping each two adjacent ends of said brake cylinder sections, and means rigidly securing the two plates to the overlapped portions of said sections providing a rigid brake cylinder structure.

52. A brake for a rotatable member comprising rotor means secured to rotate with said member, stator means for frictionally engaging said rotor means to brake said member, annular brake cylinder means, two support elements one disposed at each of the opposite sides of said brake cylinder means, said brake cylinder means comprising two oppositely disposed arcuate sections each having a central bracket portion engaging one of said support elements, means securing said bracket portions to said support elements, rigid elements overlying the adjacent ends of said two sections, means rigidly securing said overlying elements to said sections, a brake cylinder piston in each brake cylinder section adapted to actuate said brake upon supply of fluid under pressure to a pressure chamber at one side of the piston, a fluid conducting pipe at each of said support elements, each of said brackets having a passage open to the respective pipe through the face engaging the support element, and a pipe in each brake cylinder section connecting said passage and the brake cylinder pressure chamber therein.

53. In a railway car truck having a frame, journal bearings carrying said frame, a wheel and axle supporting structure carrying said bearings, and comprising two spaced wheels one disposed adjacent each of said bearings, a brake disposed adjacent each wheel comprising rotor means and stator means adapted to cooperate to brake said wheel and axle supporting structure, means securing said rotor means to rotate with said wheel and axle supporting structure, annular brake cylinder means for each brake comprising two oppositely disposed arcuate sections one disposed at each of the opposite sides of the axis of said structure, means rigidly securing said sections of each brake together, each section having intermediate its ends a support bracket, a structure supporting said stator means and brake cylinder means of both brakes comprising two side pieces one disposed at each of the opposite sides of the axis of said wheel and axle structure and extending parallel to the axis thereof and two end pieces one carried by each of said journal bearings and carrying the adjacent ends of said side pieces, a brake cylinder piston in each of said brake cylinder sections for actuating the respective brake upon supply of fluid under pressure to a pressure chamber therein, each of said brake cylinder sections having a bracket portion rigidly secured against the adjacent side piece and a fluid conducting communication connecting said pressure chamber therein to said bracket, a pipe for each brake connecting said fluid conducting communications at the opposite sides of said wheel and axle structure, said pipe extending from the bracket portions of the oppositely disposed sections toward the adjacent ends of the said two side pieces and along the connecting end piece and being carried thereby, another pipe carried by one of said side pieces and connected at opposite ends to the fluid conducting communication in the two brackets connected to said one side piece, and a fluid pressure supply and release means connected to the last named pipe.

54. A brake for a rotatable member comprising a fixed stator disk, and a rotor disk adapted to be moved axially into frictional contact with said stator disk for braking said member, means securing said rotor disk to rotate with said member, brake cylinder means for actuating said rotor disk, said brake cylinder means comprising two like oppositely disposed arcuate sections arranged in coaxial relation with said disks, a plate overlying each adjacent pair of oppositely disposed ends of said brake cylinder sections, means rigidly securing each plate to the brake cylinder sections for providing a rigid substantially annular brake cylinder structure, means rigidly securing a portion of both of said plates to spaced portions of said stator for supporting same from said brake cylinder device, and piston means in both sections of said brake cylinder device operable by fluid under pressure for actuating said rotor disk.

55. A disk brake for a rotatable member comprising an inner fixed stator, an intermediate stator, an outer stator and two rotors interleaved with said stators in coaxial relation therewith, said intermediate stator and outer stator and said rotors being axially movable in the direction of said fixed stator into frictional interengagement for braking said member, means securing said rotors to rotate with said member, annular brake cylinder means encircling said outer stator and comprising two oppositely disposed arcuate sections, a plate overlying each two adjacent ends of said sections, means rigidly securing said plates to said sections thereby providing a rigid substantially annular brake cylinder structure, said fixed stator having a plurality of arms spaced from each other around its periphery and extending parallel to the axis thereof in the direction of said brake cylinder sections and into contact therewith, means rigidly securing the contacting ends of said arms to said brake cylinder sections, each of said plates having a portion overlapping certain of said arms, means rigidly securing such portions of said plates to the overlapped portions of said arms, brake cylinder piston means in each of said sections movable by fluid under pressure in the direction of said fixed stator, and means operatively connecting said piston means to said outer stator to thereby render said piston means operable to move said rotors and stators into frictional interengagement.

56. In a railway car truck having a frame, two coaxially aligned journal bearings carrying said frame, and wheel and axle supporting means carrying said bearings, in combination, a brake for each of said wheels comprising rotor means secured to rotate with the wheel, and stator means arranged to be moved axially into frictional engagement with said rotor means for braking the wheel, power means for each brake for actuating the said stator means thereof, means securing said rotor means of both brakes to rotate with said wheel and axle supporting means in coaxial relation therewith, a structure carried by said wheel and axle supporting means comprising two side pieces one disposed at each of the opposite sides of said wheel and axle supporting means and extending parallel to the axle thereof, means connecting said stator means and power means of both brakes to said side pieces for supporting same, a rockable operating rod for each of said brakes extending between both of said side pieces and having journal connections therewith, means operatively connecting one of said rods to one of said brakes for rendering said rod operable upon rocking to actuate the connected brake, actuating means connecting the other rod to the other brake, and hand operated means connected to both of said rods for simultaneously actuating same.

57. In a railway car truck having a frame, two coaxially aligned journal bearings carrying said frame, and wheel and axle supporting means carrying said bearings, in combination, a brake for each of said wheels comprising rotor means secured to rotate with the wheel, and stator means arranged to be moved axially into frictional engagement with said rotor means for braking the wheel, power means for each brake for actuating the said stator means thereof, means securing said rotor means of both brakes to rotate with said wheel and axle supporting means in coaxial relation therewith, a structure carried by said wheel and axle supporting means comprising two side pieces one disposed at each of the opposite sides of said wheel and axle supporting means and extending parallel to the axis thereof, means connecting said stator means and power means of both brakes to said side pieces for supporting same, a rockable operating rod for each of said brakes extending between both of said side pieces and having journal connections therewith, means operative connecting one of said rods to one of said brakes for rendering said rod operable upon rocking to actuate the connected brake, actuating means connecting the other rod to the other brake, lever means carried by said truck frame, flexible operating means connecting said lever means with said rods, and hand operated means on said truck frame connected to the lever means for simultaneously operating both of said rods to actuate said brakes.

58. In a railway car truck having a frame, two coaxially aligned journal bearings carrying said frame, and wheel and axle supporting means carrying said bearings, in combination, a brake for each of said wheels comprising rotor means secured to rotate with the wheel, and stator means arranged to be moved axially into frictional engagement with said rotor means for braking the wheel, power means for each brake for actuating the said stator means thereof, means securing said rotor means of both brakes to rotate with said wheel and axle supporting means in coaxial relation therewith, a structure carried by said wheel and axle supporting means comprising two side pieces one disposed at each of the opposite sides of said wheel and axle supporting means and extending parallel to the axis thereof, means connecting said stator means and power means of both brakes to said side pieces for supporting same, a rockable operating rod for each of said brakes extending between both of said side pieces and having journal connections therewith, means operatively connecting one of said rods to one of said brakes for rendering said rod operable upon rocking to actuate the connected brake, actuating means connecting the other rod to the other brake, hand operated means connected to both of said rods for simultaneously actuating same, and release springs for each brake, each of said springs being anchored at one end on one of said side pieces and connected at the opposite end to the stator means of the respective brake for urging such stator means out of contact with the rotor means of the brake upon release of said power means and hand operated means.

JOSEPH C. McCUNE.